US012614197B2

(12) United States Patent
Ma et al.

(10) Patent No.: US 12,614,197 B2
(45) Date of Patent: Apr. 28, 2026

(54) SYSTEM AND METHOD FOR INTELLIGENT RESOURCE MANAGEMENT

(71) Applicant: ROYAL BANK OF CANADA, Toronto (CA)

(72) Inventors: Mary Xiaoyu Ma, Oakville (CA); Joel Aidan Gritter, Vineland Station (CA); Inaara Hasmani, Toronto (CA); Nicholas Andrien Prayogo, Toronto (CA); Imran Habib, Toronto (CA); Richard Stanton, Toronto (CA); Jenna Hague, Mississauga (CA); Victor Cheng, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 0 days.

(21) Appl. No.: 17/401,538

(22) Filed: Aug. 13, 2021

(65) Prior Publication Data

US 2022/0067756 A1 Mar. 3, 2022

Related U.S. Application Data

(60) Provisional application No. 63/071,704, filed on Aug. 28, 2020.

(51) Int. Cl.
| | |
|---|---|
| *G06Q 30/0201* | (2023.01) |
| *G06F 18/21* | (2023.01) |
| *G06N 20/00* | (2019.01) |
| *G06Q 20/38* | (2012.01) |
| *G06Q 30/0202* | (2023.01) |
| *G06Q 30/0207* | (2023.01) |

(52) U.S. Cl.
CPC ....... *G06Q 30/0201* (2013.01); *G06F 18/217* (2023.01); *G06N 20/00* (2019.01); *G06Q 30/0202* (2013.01); *G06Q 30/0207* (2013.01); *G06Q 20/389* (2013.01)

(58) Field of Classification Search
None
See application file for complete search history.

(56) References Cited

U.S. PATENT DOCUMENTS

| | | | | |
|---|---|---|---|---|
| 10,802,849 B1* | 10/2020 | Trim | ...... | G06N 5/043 |
| 2012/0144340 A1* | 6/2012 | Knight | ...... | G06F 40/169 |
| | | | | 715/781 |
| 2017/0006135 A1* | 1/2017 | Siebel | ...... | G06F 8/10 |
| 2017/0316324 A1* | 11/2017 | Barrett | ...... | G06N 20/20 |
| 2018/0075372 A1* | 3/2018 | Job | ...... | G06Q 10/0635 |

(Continued)

*Primary Examiner* — Chesiree A Walton
(74) *Attorney, Agent, or Firm* — NORTON ROSE FULBRIGHT CANADA LLP

(57) ABSTRACT

A computer system and method for intelligent system diagnostics and management is provided. The system comprises at least one processor and a memory storing instructions which when executed by the processor configure the processor to perform the method. The method comprises receiving resource data and usage data, preprocessing the resource data and the usage data into operational data, training and updating a foresight model using the operational data, receiving a forecast generated by the foresight model, and sending a notification for a recommended action based on the forecast. The forecast may be associated with a future resource state or event associated with the operational data.

20 Claims, 29 Drawing Sheets

(56) References Cited

U.S. PATENT DOCUMENTS

| | | | |
|---|---|---|---|
| 2018/0096417 A1* | 4/2018 | Cook | G06N 5/01 |
| 2019/0121334 A1* | 4/2019 | Song | G06N 20/00 |
| 2019/0122307 A1* | 4/2019 | Sayed | G06Q 20/389 |
| 2022/0028001 A1* | 1/2022 | Wachell | G06N 5/025 |

* cited by examiner

300

Receive resource and usage data
310

Preprocess resource and usage data into operational data
320

Train/Update foresight model using operational data
330

Receive forecast
340

Send notification for recommended action
350

700

750

830

Actionable Items

Offers

Push promotional offers to offset rise in inventory prices by increasing sales volume. Onboard with our partners by clicking the platform where you would like to push an offer.

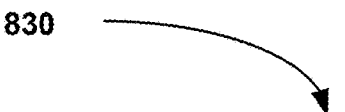     ᴅʀᴏᴘ     ⊛dipp™     ampli

E-Commerce

Your business is relying heavily on in-person sales. Build an online business and push e-commerce sales through bookmark. Use Moneris to allow customers to pay through the online store.

Loan

Your cash flow is lower than usual and you have an inventory purchase for next week above your current cash flow. Pre-approve for a day-to-day loan today, click here.

Cancel

Return to previous step

Push new offer: Create your offer

Choose your promotional period

Jul 26, 2020 - Aug 1, 2020

Recommended promotional period: Jul 26, 2020 - Aug 1, 2020

Select your promotion type

Select your promotion amount

Select an option

Select a minimum spend

Select an option

Cancel                    Next

960

970

980

Return to previous step

Push New Offer: Confirm your offer details

| Customer Reach | 20,000 customers |
| Number of customers you can reach with your promotion. | |

| Estimated Uptake | 5% |
| Percentage of customers that will take the promotion. | |

| Foresight Commission | 1% |
| Amount Foresight will take off of every Sale purchase. | |

| Total Estimated Cost | $400 - $1200 |

Promotion Platforms

 ampli drop

| Cancel | Submit offer |

FIG. 9H

SYSTEM AND METHOD FOR INTELLIGENT RESOURCE MANAGEMENT

CROSS REFERENCE TO RELATED APPLICATIONS

This application is a non-provisional of, and claims all benefit, including priority, to U.S. Application No. 63/071, 704, dated Aug. 28, 2020 entitled SYSTEM AND METHOD FOR INTELLIGENT RESOURCE MANAGE-MENT and incorporated herein in its entirety by reference.

FIELD

The present disclosure relates generally to system diagnostics, and in particular to a system and method for intelligent resource management.

INTRODUCTION

There are products that provide business insight by analyzing current data. Such products allow for analysis of the current sales and inventory of a business.

SUMMARY

In one embodiment, there is provided a system for intelligent resource management. The system comprises at least one processor and a memory storing instructions which when executed by the processor configure the processor to receive resource data and usage data, preprocess the resource data and the usage data into operational data, train and update a foresight model using the operational data, receive a forecast generated by the foresight model, and send a notification for a recommended action based on the forecast. The forecast associated with a future resource state or event associated with the operational data.

In another embodiment, there is provided a method of intelligent resource management. The method comprises receiving resource data and usage data, preprocessing the resource data and the usage data into operational data, training and updating a foresight model using the operational data, receiving a forecast generated by the foresight model, and sending a notification for a recommended action based on the forecast. The forecast associated with a future resource state or event associated with the operational data.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures:

FIGS. 8A to 8E illustrate portion of the scenario planner tool user flow, in accordance with some embodiments;

FIGS. 9A to 9I illustrate portions of the scenario planner tool user flow, in accordance with some embodiments;

It is understood that throughout the description and figures, like features are identified by like reference numerals.

DETAILED DESCRIPTION

Embodiments of methods, systems, and apparatus are described through reference to the drawings.

In some embodiments, the intelligent resource management system described herein may be applied to intelligent system diagnostics and management, and/or to intelligent forecasting and action recommendation.

In some embodiments, a tool is provided to recommended actions for a user/department to take based on past actions in view of a current situation. For example, if sales are currently below average (determined by the system) actions which have increased sales in the past under similar circumstances are recommended.

Sales, customer, location and competitor insight data may be derived from raw data. In some embodiments, scenario planning, promotions/offers, expense manager, real-time cash flow analysis and predictive loan analysis may also be provided. These functionalities may be combined in a cohesive solution to not only display relevant insights, but also provide users one or more recommendations to execute on those insights.

For example, through real-time cash flow analysis, it may be seen that a user's sales are stagnating. A notification may be pushed to the user to suggest that they push a promotion. Using sales and customer insights, an optimal promotion may be suggested, based on their historical data. Through the promotions/offers component, the user may push the promotion for approval.

In some embodiments, a foresight platform has the flexibility to include new data and to push new types of insights. For instance, if an enterprise acquires and integrates inventory data, the platform could allow users to push promotions specific to products based on stock keeping unit (SKU) data.

Figure 1A:
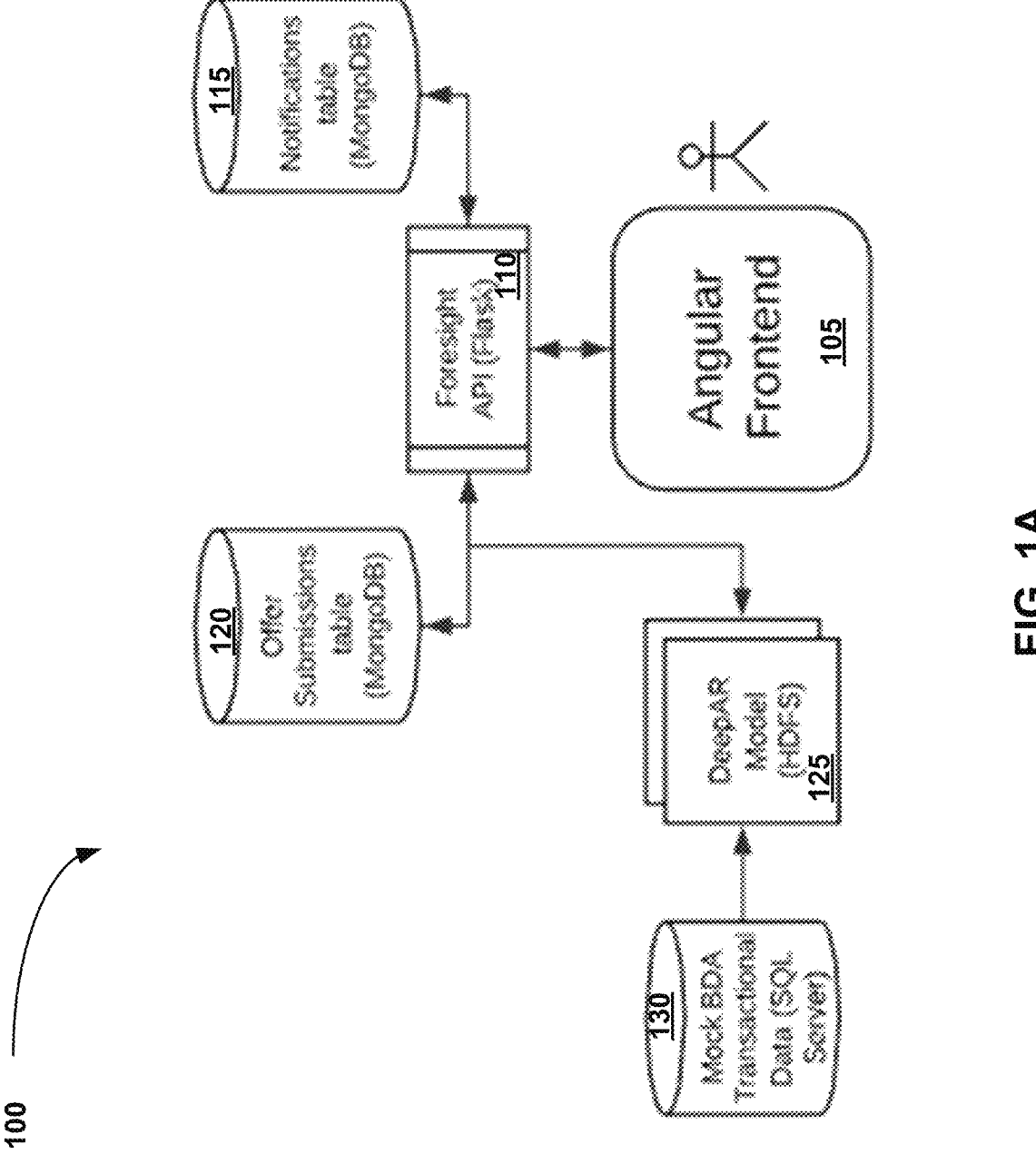
FIG. 1A illustrates, in a schematic diagram, an example of an intelligent resource management architecture, in accordance with some embodiments.

FIG. 1A illustrates, in a schematic diagram, an example of an intelligent system diagnostics and management architecture 100, in accordance with some embodiments. The architecture 100 comprises a user interface 105, an API 110, a notifications table 115, an offer submissions table 120, a model 125, and a transactional data server 130. Other components may be added to the architecture 100.

Figure 1B:
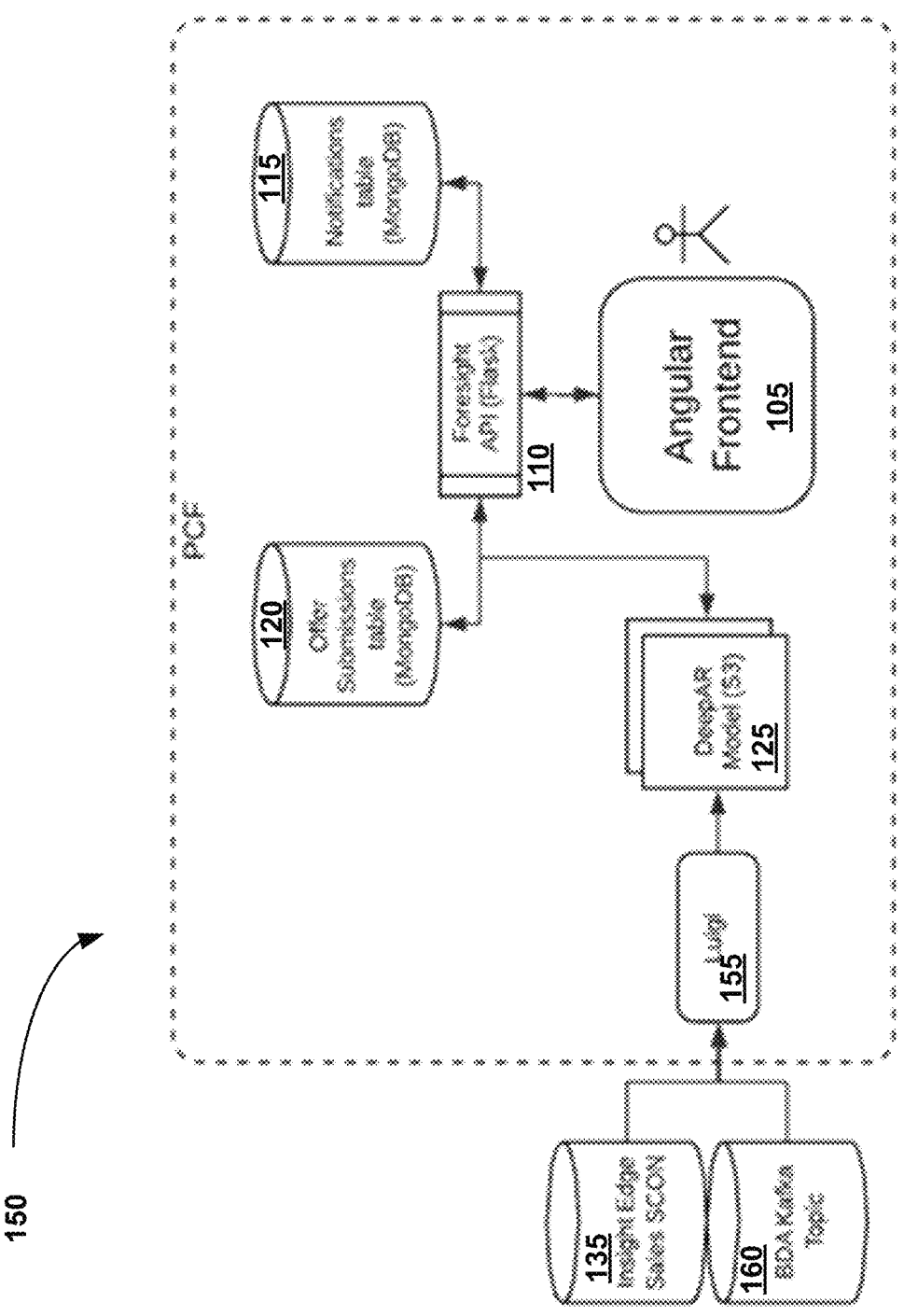
FIG. 1B illustrates, in a schematic diagram, another example of an intelligent resource management architecture, in accordance with some embodiments.

FIG. 1B illustrates, in a schematic diagram, another example of an intelligent system diagnostics and management architecture 150, in accordance with some embodiments. The architecture 150 comprises a pivotal cloud foundry (PCF) 165, a transactional data server 135, and a business deposit account (BDA) data server 160. The PCF 165 comprises the user interface 105, the API 110, the notifications table 115, the offer submissions table 120, the model 125, and a data pipeline 155. Other components may be added to the architecture 150.

Data may be ingested from a BDA transactional data server (in the form of a Kafka topic) 160 and a sales structured query language (SQL) consolidated environment (SCON) 135. Data may be ingested, processed, and aggregated with an extract, transform, load (ETL) pipeline 155 framework that schedules processes to ensure data is complete in every step of the process. Processed and prepared data may then be used to train the model 125 (such as a DeepAR Model hosted on S3). The trained model may then generate forecasts that are used to recommend offers, in which clients can make offers based on these recommendations and save them into the offers submissions table 120 (e.g., on MongoDB, a No-SQL database). An API 110 (e.g., based on Flask, a Python framework for backend and API creation that allows data from a database to be processed and fed into the user interface) requests for forecasts/data from the backend and feeds them into the frontend (user interface 105). A notifications table 105 (e.g., on MongoDB) is used to save notifications and allows clients to access notifications such as action recommendations.

Figure 2A:
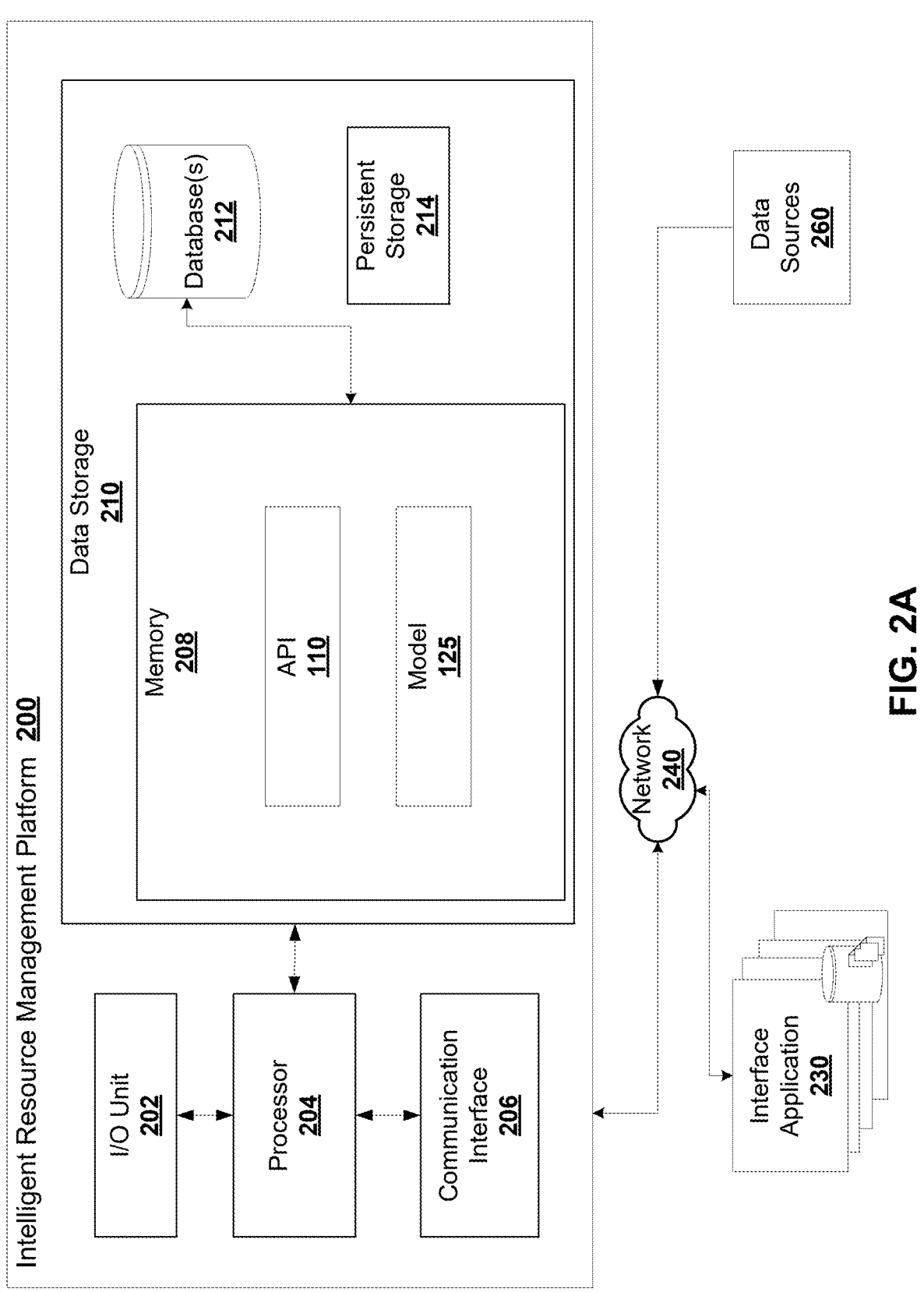
FIGS. 2A and 2B illustrate, in a schematic diagrams, examples of an intelligent resource management platform, in accordance with some embodiments.

FIG. 2A illustrates, in a schematic diagram, an example of an intelligent system diagnostics and management platform 200, in accordance with some embodiments. The platform 200 may be an electronic device connected to interface application 230 and data sources 260 via network 240. The platform 200 can implement aspects of the processes described herein.

The platform 200 may include a processor 204 and a memory 208 storing machine executable instructions to configure the processor 204 to receive a voice and/or text files (e.g., from I/O unit 102 or from data sources 260). The platform 200 can include an I/O Unit 202, communication interface 206, and data storage 210. The processor 204 can execute instructions in memory 208 to implement aspects of processes described herein.

The platform 200 may be implemented on an electronic device and can include an I/O unit 202, a processor 204, a communication interface 206, and a data storage 210. The platform 200 can connect with one or more interface devices 230 or data sources 260. This connection may be over a network 240 (or multiple networks). The platform 200 may receive and transmit data from one or more of these via I/O unit 202. When data is received, I/O unit 202 transmits the data to processor 204.

The I/O unit 102 can enable the platform 100 to interconnect with one or more input devices, such as a keyboard, mouse, camera, touch screen and a microphone, and/or with one or more output devices such as a display screen and a speaker.

The processor 204 can be, for example, any type of general-purpose microprocessor or microcontroller, a digital signal processing (DSP) processor, an integrated circuit, a field programmable gate array (FPGA), a reconfigurable processor, or any combination thereof.

The data storage 210 can include memory 208, database(s) 212 and persistent storage 214. Memory 208 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 210 can include memory 208, databases 212 (e.g., graph database), and persistent storage 214.

The communication interface 206 can enable the platform 200 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WIMAX), SS7 signaling network, fixed line, local area network, wide area network, and others, including any combination of these.

The platform 200 can be operable to register and authenticate users (using a login, unique identifier, and password for example) prior to providing access to applications, a local network, network resources, other networks and network security devices. The platform 200 can connect to different machines or entities.

The data storage 210 may be configured to store information associated with or created by the platform 200. Storage 210 and/or persistent storage 214 may be provided using various types of storage technologies, such as solid state drives, hard disk drives, flash memory, and may be stored in various formats, such as relational databases, non-relational databases, flat files, spreadsheets, extended markup files, etc.

The memory 208 may include the API 110 and the model 125.

Figure 2B:
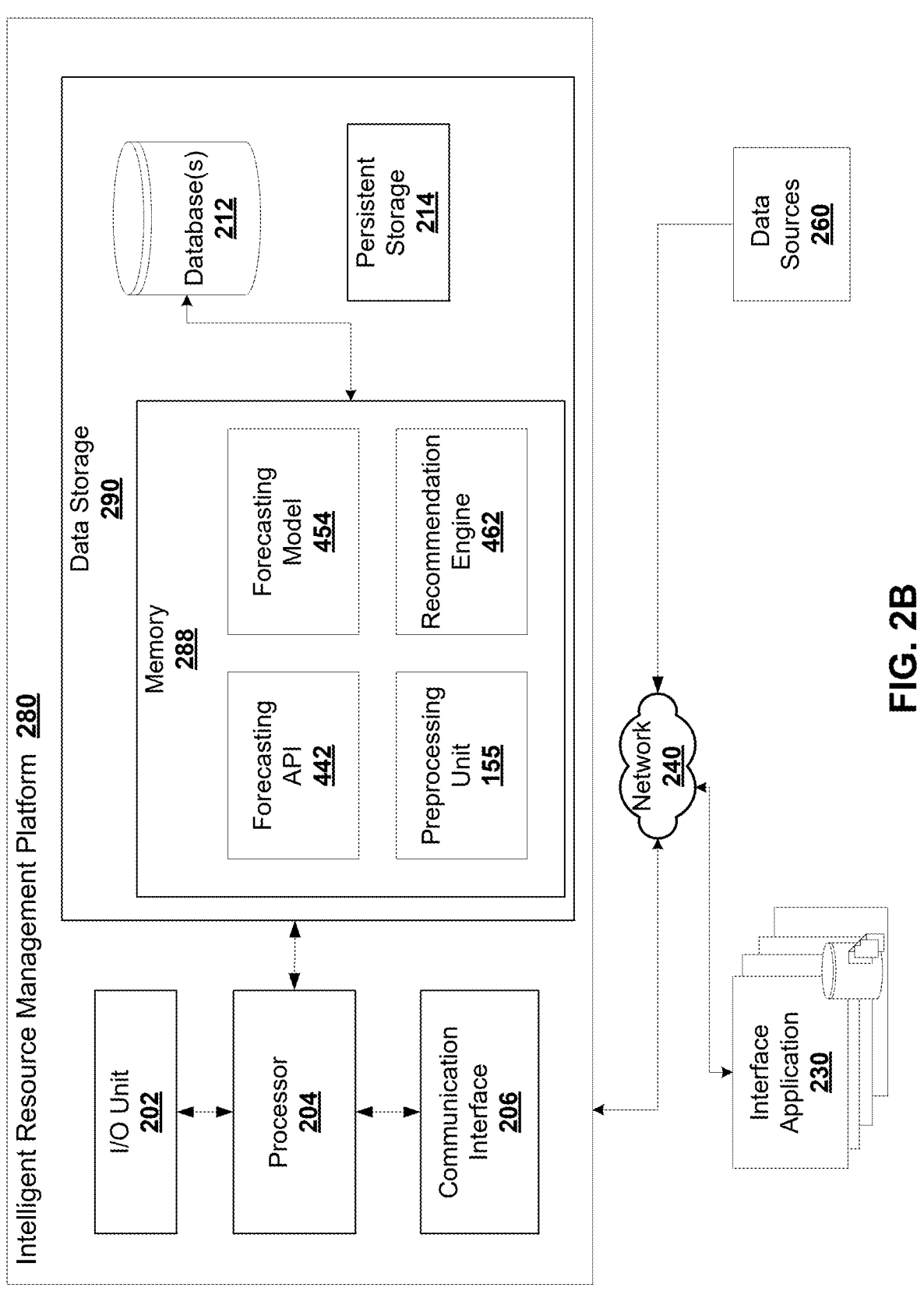

FIG. 2B illustrates, in a schematic diagram, another example of an intelligent system diagnostics and management platform 280, in accordance with some embodiments.

The platform 280 may also be an electronic device connected to interface application 230 and data sources 260 via network 240. The platform 280 can implement aspects of the processes described herein.

The platform 280 may include the processor 204 and a memory 288 storing machine executable instructions to configure the processor 204 to receive a voice and/or text files (e.g., from I/O unit 102 or from data sources 260). The platform 280 can include the I/O Unit 202, communication interface 206, and data storage 290. Data storage 290 may be similar to data storage 210 that replaces memory 208 with memory 288. The processor 204 can execute instructions in memory 288 to implement aspects of processes described herein.

The memory 288 may include a forecasting API 442, forecasting model 454, a preprocessing unit 155, and a recommendation engine 462.

Figure 3A:
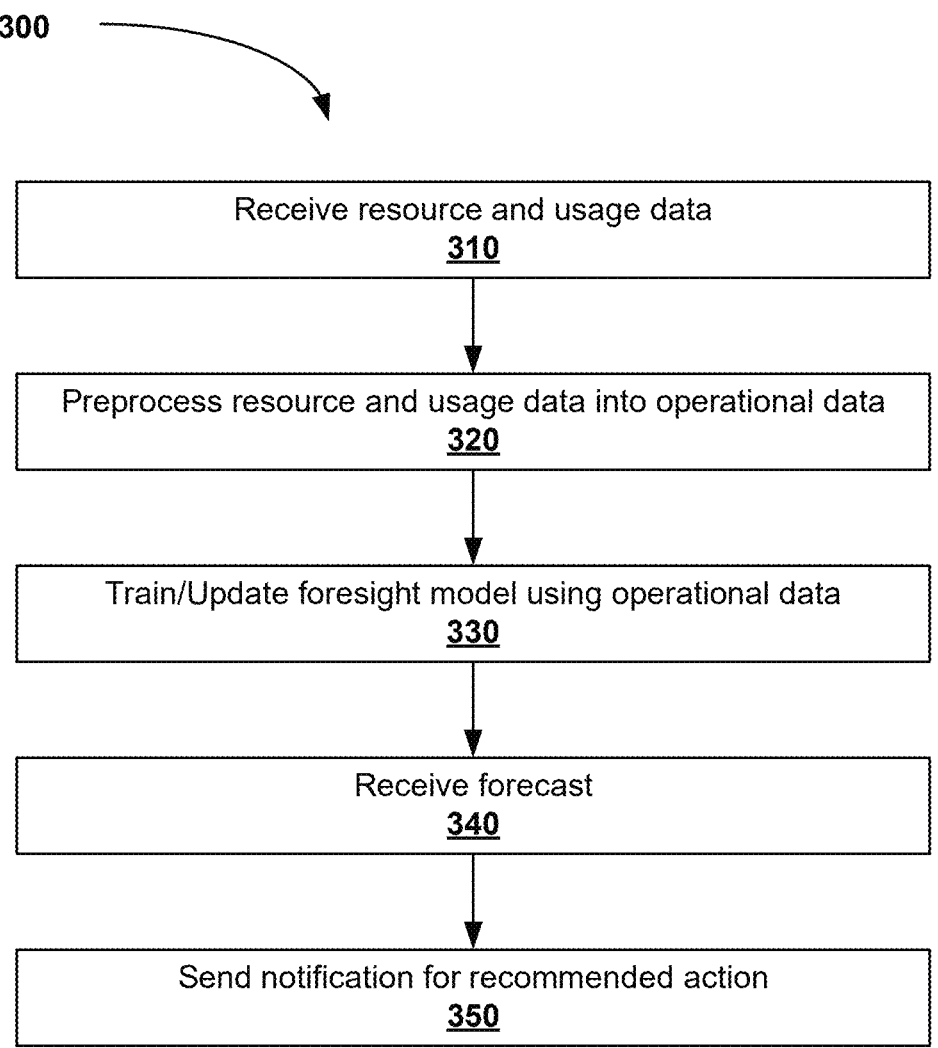
FIG. 3A illustrates, in a flowchart, an example of a method of intelligent resource management, in accordance with some embodiments.

FIG. 3A illustrates, in a flowchart, an example of a method of intelligent resource management 300, in accordance with some embodiments. The method 300 comprises receiving 310 resource data and usage data, preprocessing 320 the resource data and the usage data into operational data, training and updating 330 a foresight model 125 using the operational data, receiving 340 a forecast (e.g., prediction or range of predictions of a client's future financial positions, including sales/sales volume, income, expenses, etc.) generated by the foresight model 125, and sending 350 a notification for a recommended action based on the forecast. The forecast may be associated with a future resource state or event associated with the operational data. Other steps may be added to the method including initially training the foresight model 125. In some embodiments, the foresight model 125 may be trained with labelled data using an autoregressive approach. During training, the model 125 may self-adjust weights used in the model. In some embodiments, the usage data may comprise insight data and/or sales data.

In some embodiments, resource data may comprise business deposit accounts (BDA) data of clients identified using a client identifier. Usage data may comprise historical transactions (e.g., from POS terminals) where each transaction has an identifier linked to a BDA account of each client. Operational data may comprise resource data merged with usage data and enhanced with other data (e.g., location, demographics, etc.). Operation data may be generated using data pipelines tools (e.g., Luigi).

Figure 3B:
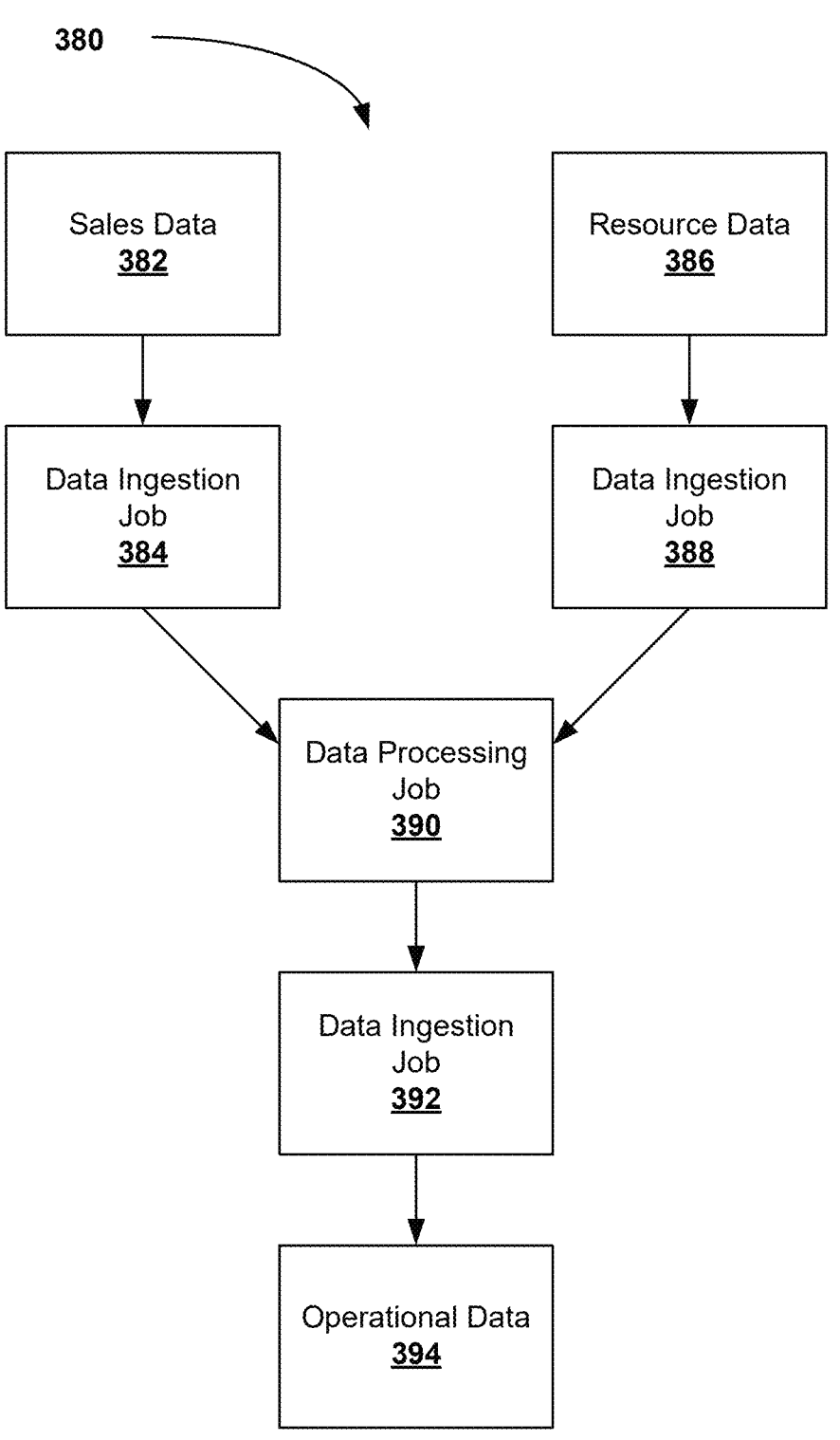
FIG. 3B illustrates, in a flow diagram, an example of a method of transforming data into operational data, in accordance with some embodiments.

FIG. 3B illustrates, in a flow diagram, an example of a method of transforming data into operational data 380, in accordance with some embodiments. In some embodiments, usage data may comprise sales data. Sales Data 382 (e.g., Insight Edge Sales Data) stored in data repository 135 may include transactional data (e.g., purchase amount, purchase date, point of sale (POS) terminal identifier (ID), etc.), merchant information (e.g., store name, store address, merchant ID, etc.) and client card information (e.g., bank debit or credit card used in transaction). Sales data 382 may be input into a data ingestion job function 384 (e.g., a Python/SQL program and executed using a data pipeline tool. Ingestion jobs may load data into an intelligent resource management ecosystem for processing. Resource data 386 stored in data repository 160 may include a commercial account number (e.g., a bank specific BDA number) and a client identifier (e.g., a bank specific service reference file (SRF) number). Resource data 386 may be input into another data ingestion job 388 to load the data into the ecosystem for processing.

The data ingestion jobs 384, 388 may load the respective data 382, 386 into a data processing job unit 390. The data processing job unit 390 may also be a Python/SQL program executed using a data pipeline tool. The data processing job unit 390 may merge data inflows (e.g., sales data 382 and resource data 386) to output a more robust and enhanced form of the data. In some embodiments, relevant fields, such as SRF number and purchase amount, may be kept/maintained intact and linked between the inflows. This processing allows for transactional data to be linked to client accounts.

The output of the data processing job 390 may then be input into a data ingestion job 392. The output of the data ingestion job 392 comprises operational data 394 which has linked the client (e.g., via SRF number and BDA account) to their transactions. This operational data 394 may now be used to derive insights and can be served to the correct clients.

In some embodiments, the recommended action is based on the forecast being below a threshold. In some embodiments, the recommended action is based on a match between the recommended action and the forecast. In some embodiments, the notification based on a current time and a location of a market associated with the resource data.

In some embodiments, the resource data comprises transactional data, the usage data comprises at least one of sales data, customer data, location data, competitor data, and inventory data, and the recommended action comprises an offer or sales promotion. In some embodiments, usage data comprises insight data where the sales data comprises sales insight data, the customer data comprises customer insight data, the location data comprises location insight data, and the competitor data comprises competitor insight data.

Figure 4A:
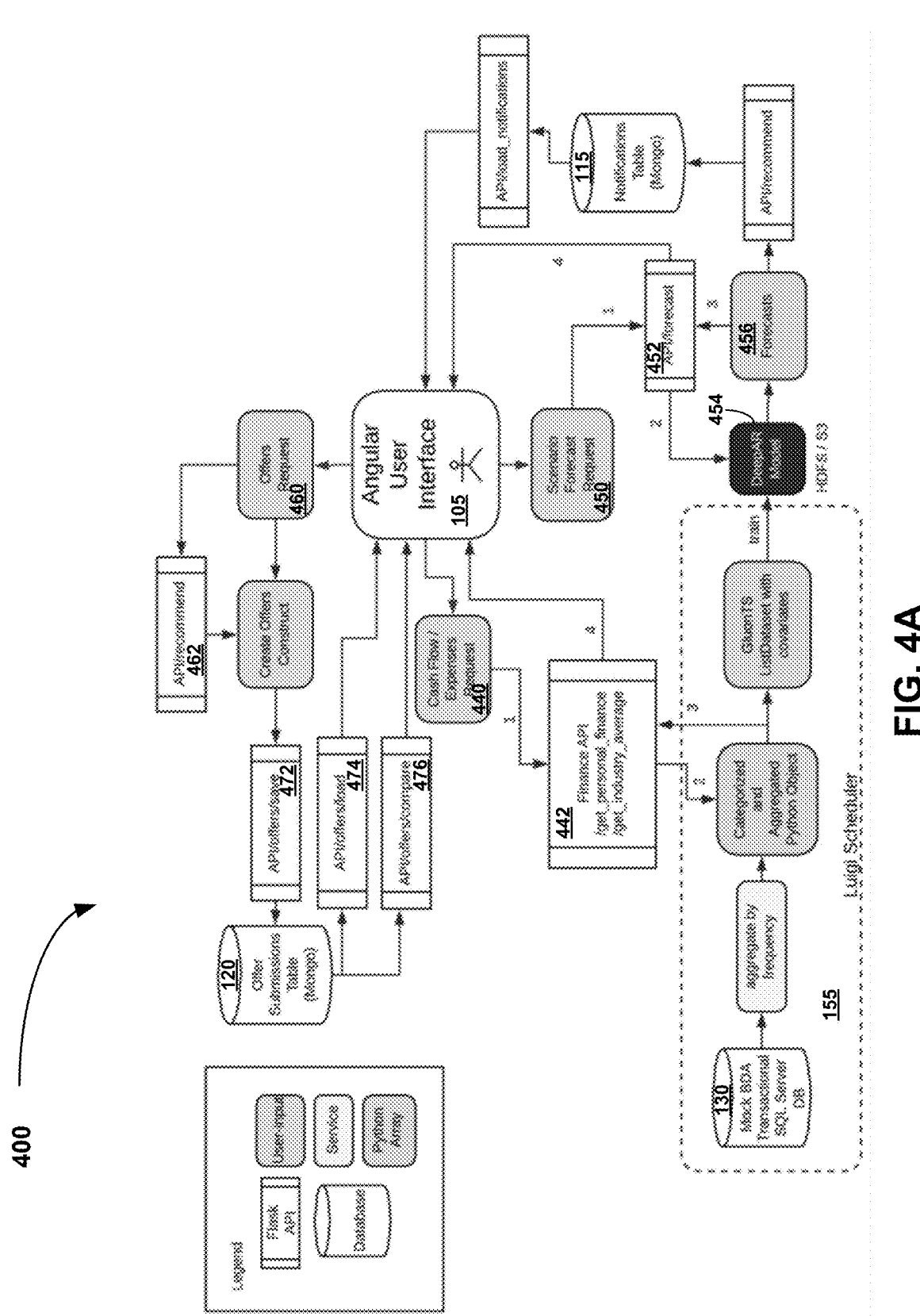
FIG. 4A illustrates, in a process flow diagram, an example of a process for intelligent resource management, in accordance with some embodiments.

FIG. 4A illustrates, in a process flow diagram, an example of a process for intelligent system diagnostics and management 400, in accordance with some embodiments.

Figure 4B:
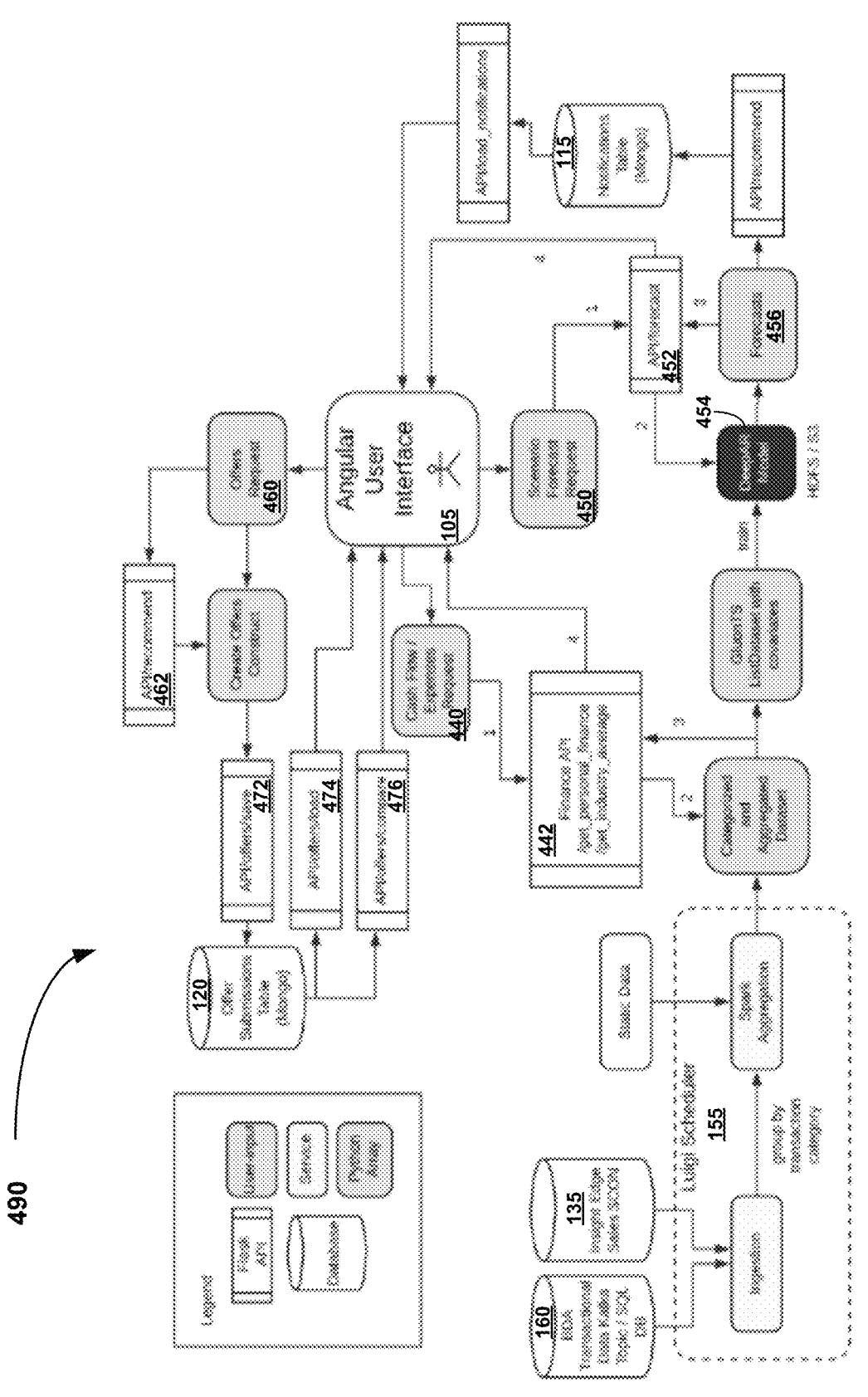
FIG. 4B illustrates, in a process flow diagram, another example of a process for intelligent resource management, in accordance with some embodiments.

FIG. 4B illustrates, in a process flow diagram, another example of a process for intelligent system diagnostics and management 490, in accordance with some embodiments.

In some embodiments, the pipeline leverages BDA transactional data, enriched with location-based sales data as well as other types of data (static data can be used as a placeholder) such as accounting data (via integration with an accounting software), inventory data (via integration with inventory software), and supporting data (such as weather, macroeconomic data, COVID-19 recovery data, etc.) to give business as detailed insights as possible.

In some embodiments, data loading, transformation, and aggregation is performed using a Python package (e.g., Luigi) to build pipelines of batch jobs.

Once data is processed, it is converted into a data set (e.g., a GluonTS (Python library) ListDataset) used to feed the data into a DeepAR model.

In some embodiments, there are three requests a client can make at the user interface 105: cash flow/expenses report 440, forecast requests 450, and offers requests 460. These will be described in more detail.

Cash Flow/Expenses Request 440

This flow 440 will provide cash flow, income and expense data (in the format shown below with respect to the sample markup code for a personal finance option) for both the client's personal finances (e.g., from the client's business deposit account and credit transactions), as well as for the industry average (e.g., aggregated transactions). This data may be used/displayed in various places throughout the application. For example, see cash flow curve 520 in FIG. 5A (for the months of April, May), industry average figures in FIG. 5B, expense analytics section 812 in FIG. 8A, and cash flow details for April and May in FIGS. 8B and 8D.

Here, a client wants to look at their past transactions and how they compare to the industry. This takes them to the Finance API endpoint-group 442:

/finance/get_personal_finance: based on time interval that client requests (daily, weekly, monthly), retrieve categorized transactional data which can be plotted or aggregated in the front end (Angular UI 105)

/finance/get_industry_average: retrieve aggregated industry expenses based on client's merchant category code (MCC). For instance, if client has MCC XYZ, they can only access industry average of industry XYZ.

The following is a portion of a sample markup code for a personal finance output:

```
get_personal_finance{
    "transactions": {
        "Sales": [
            46005,
            43249,
            42843,
            46634,
            45237,
            43970
        ],
        "Payroll": [
            -4504,
            -3609,
            -3193,
            -3331,
            -3483,
            -3026
        ],
        "Insurance": [
            -270,
            -175,
            -132,
            -160,
            -157,
            -202
        ],
        "Rent": [
            -1200,
            -1200,
            -1200,
            -1200,
            -1200,
            -1200
        ],
    }
}
```

Figure 5A:
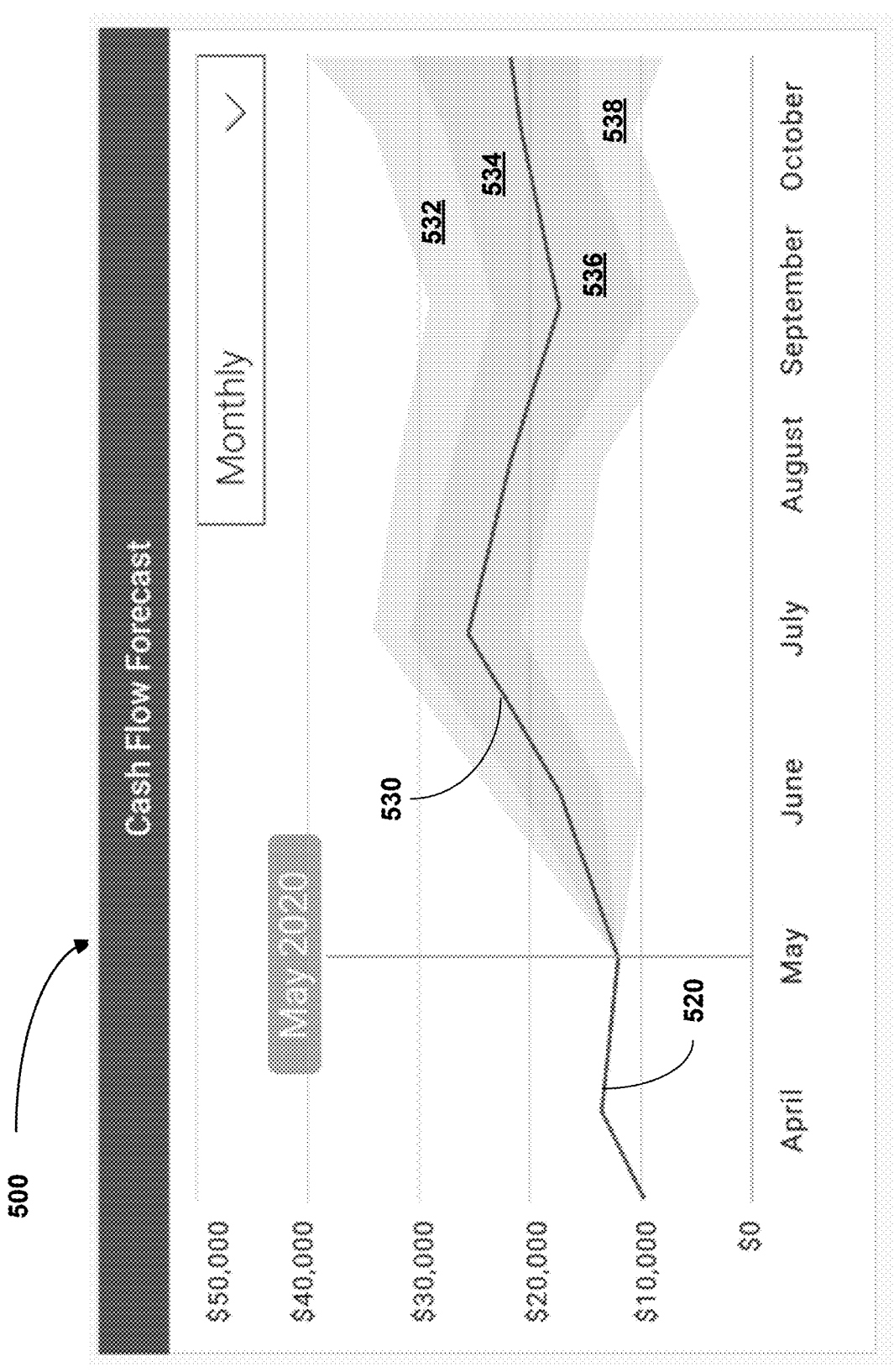
FIG. 5A illustrates, in a screenshot, an example of an output of a personal finance view, in accordance with some embodiments.

FIG. 5A illustrates, in a screenshot, an example of an output of a personal finance view 500, in accordance with some embodiments. FIG. 5A is a chart that shows clients their past, current, and predicted future final positions. Historical data 520 is shown by the single line to the left of the "May 2020" label. Forecasted data 530 is shown to the right of the label, with the shaded areas 532, 534, 536, 538 showing the range of predictions. The client can specify a time interval (such as daily, weekly, monthly) and the chart will update based on the selected time interval.

Figure 5B:
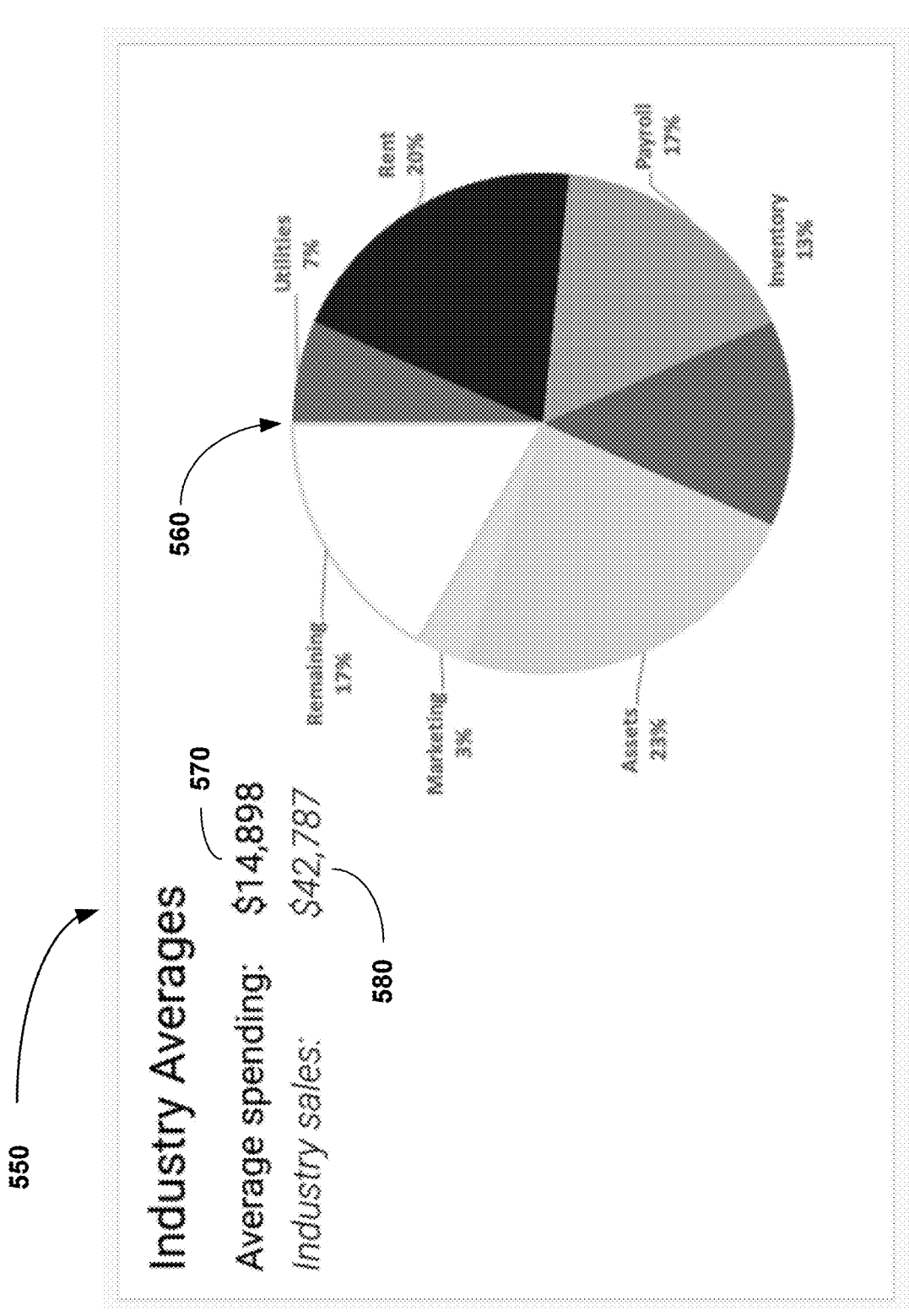
FIG. 5B illustrates, in a screenshot, an example of an output of an industry average view, in accordance with some embodiments.

FIG. 5B illustrates, in a screenshot, an example of an output of an industry average view 550, in accordance with some embodiments. FIG. 5B shows a categorical breakdown of average industry spending as a pie chart 560. The industry shown to the client is determined by the client's MCC (merchant category code). The total average spending 570 and total average sales 580 of the industry are also shown.

Scenario Forecast Request 450

This flow 450 provides forecasted financial data 530 (predicted sales, predicted expenses) for the client. The data provided is based on historical data, as well as client inputs (such as time interval, expense categories, clients' own financial projections). In some embodiments, this data may be shown a curve 530 as shown in FIGS. 5A, 8B and 8D for the months of June to October, and/or as data as shown in FIGS. 8B and 8D for the months of June to October.

In some embodiments, the client may want to check out future scenarios of their cash flow as well as make adjustments and see how this affects their forecasts. This takes them to the Forecast API endpoint group (/API/forecast 452):

/forecast 452: Based on time interval (daily, weekly monthly), transaction group (Sales, deposit, bills, rent, etc), and adjustment (0, 10%, −20%, etc) requested, forecast transaction into
1. Base Forecast (unadjusted, 2-month forecast)
2. Scenario (first half or tweakable range of base forecast with adjustments applied)
3. Future Forecast (1-month forecast based on past transactional data+scenario)

For instance, if a base forecast is [1, 1, 1, 1], a 10% adjustment means scenario would be [1.1, 1.1] and this causes (hypothetically) the model to have future forecast of [1.2, 1.2], which means the adjusted forecast is now [1.1, 1.1, 1.2, 1.2].

In some embodiments, the range of base forecast is arbitrarily set to 2 months and split into half for scenario and future forecast, but this can be adjusted based on needs.

The forecasts 456 are also served in terms of best-case, mean, and worst-case forecasts. This is made possible since the output of the DeepAR model 454 is a probability distribution which may be sampled, say 200 times, and from these samples, the 10%, mean, and 90% quantiles may be retrieved to generate worst-case, mean, and best-case forecasts 456, respectively.

Sample input:
Transaction_group: Sales
Frequency: "M" (monthly)
Adjustment: 10%
Sample output:
Past_data=[10, 20, 30, 40]
Base_forecast=[50, 60]
Scenario=[55] (caused by 10% adjustment)
Future_forecast=[62] (given by model based on new scenario→higher than 60)

Figure 6:
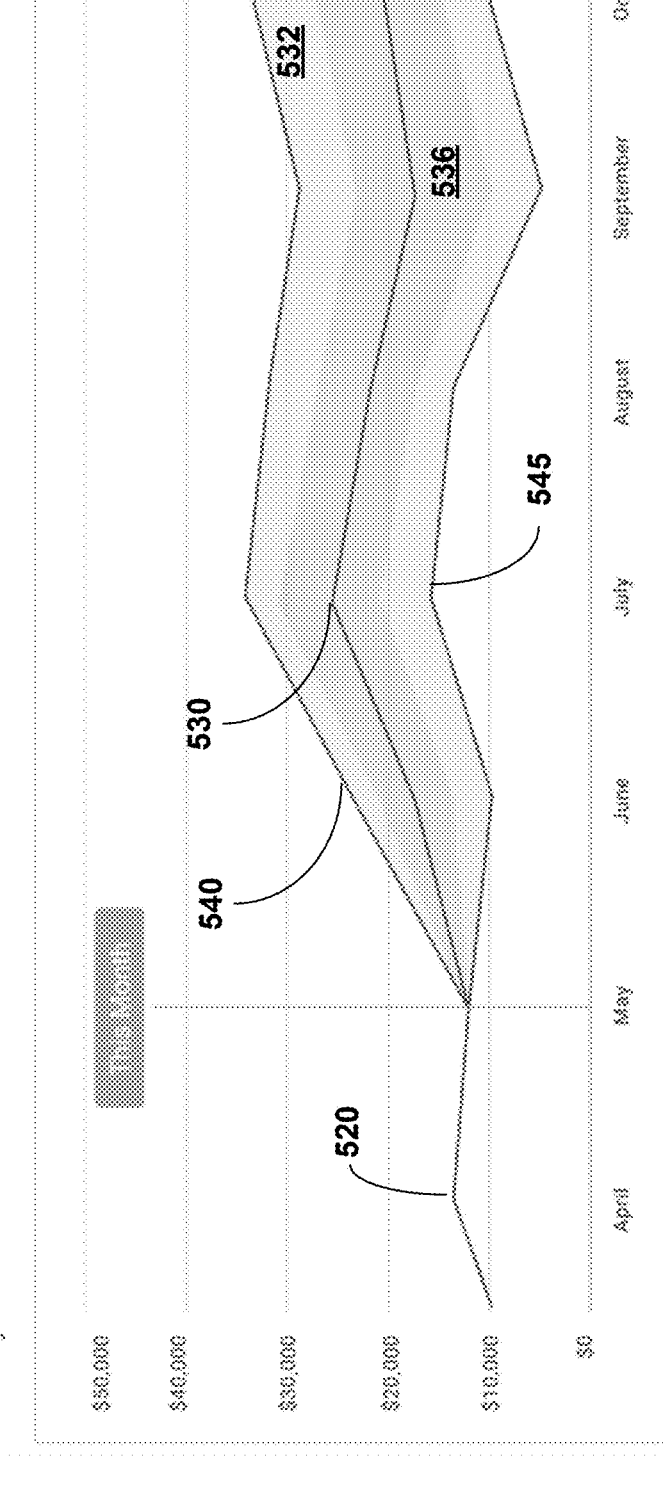
FIG. 6 illustrates, in a screenshot, an example of a scenario forecast view, in accordance with some embodiments.

FIG. 6 illustrates, in a screenshot, an example of a scenario forecast view 600, in accordance with some embodiments. In some embodiments, historical income 520 may be depicted on the chart by the single line up to the present time (indicated by the line leading up to the 'this month' label). From the present point, a range of forecasted future financial positions are predicted. The darker areas 534, 536 represent a more likely forecasting range, while the lighter areas 532, 538 represent a less likely, but possible forecasting range. The three lines branching from the present time indicate three forecasted scenarios: realistic 530, optimistic (max) 540, pessimistic (min) 545.

Offers Request 460

In some embodiments, this flow 460 provides recommendations for attributes used in clients' custom offer (promotion) construction (see, for example, FIGS. 9C, 9D, 9E, 9F, 9G, and 9H). It also may submit the clients' chosen offer details to be stored in, and distributed by, the application system.

The client may want to submit an offer construct. The/recommend API endpoint 362 may be used to recommend:

/recommend/dates: When to activate offer/promotion.

In some embodiments, rule-based techniques such as sales rate of change (e.g. make a promotion when your sales declining by 10%) and moving averages (e.g. if your sales on this day is lower than moving average, consider making a promotion). In some embodiments, once enough data is collected based on promotion effectiveness during certain dates, stochastic optimization and/or reinforcement learning may be leveraged to recommend optimal actions provided by an AI agent.

Sample output:

Dates=["10/10/2020", "5/5/2020"]

In some embodiments, the Offer Request 460 workflow may include a recommendation model that may implement a stochastic optimization (for example, see Equation (1) below) or reinforcement learning (for example, see Equation (2) below).

Figure 7A:
FIG. 7A illustrates, in a screenshot, an example of a date selection view, in accordance with some embodiments.

FIG. 7A illustrates, in a screenshot, an example of a date selection view 700, in accordance with some embodiments.

/recommend/locations: Where to activate promotion.

This leverages an API's location and customer demographic data. For instance, location regions that have top three highest shopper similarity to client (i.e. locations where the shoppers to businesses in that region has the highest spending similarity to client's shoppers) may be recommended. This outputs coordinate bounds for each region.

Sample output ("adaID" is a code for the region specified (aggregate dissemination area) and "result" shows how similar customers within the ADA are to client's business, "opacity" shows the thickness of the region as shown on the Google Maps in the user interface to show how similar this region is to client's business).

Figure 7B:
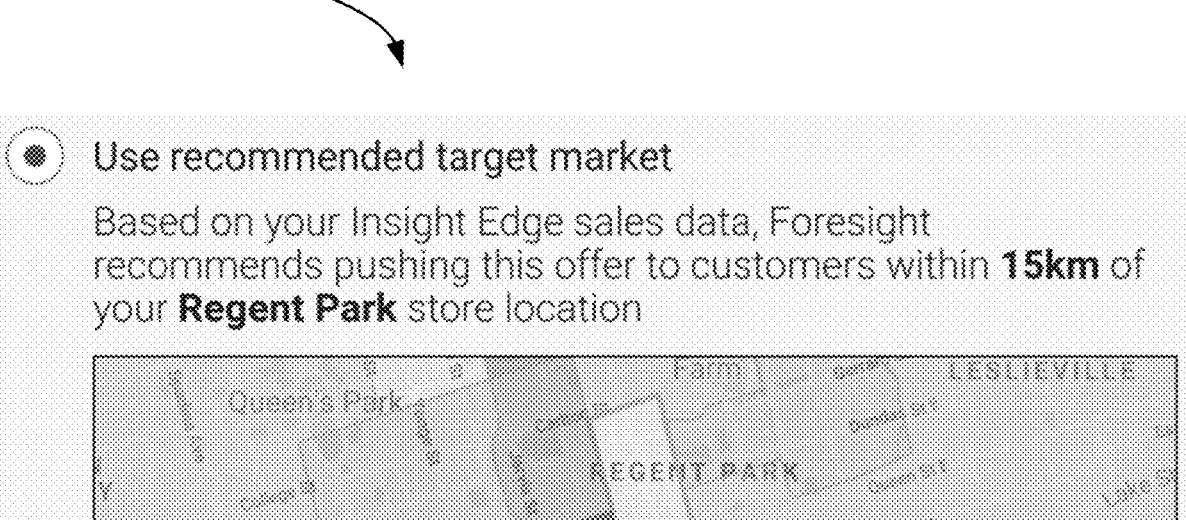
FIG. 7B illustrates, in a screenshot, an example of a location view, in accordance with some embodiments.

FIG. 7B illustrates, in a screenshot, an example of a location view 750, in accordance with some embodiments.

The/offers API endpoint may also be used to:

/offers/save 472: Allow client to save Offers/promotion submissions onto the Offers Submissions Table on MongoDB.

/offers/load 474: Allow clients to load their past or future promotions from the same table.

/offers/compare 476: Allow clients to evaluate their past promotions' effectiveness based on sales generated via promotion vs sales generated in total.

The following is a portion of a sample markup code for an offers/promotion output:

```
offers/{
    "promotion_id": "5f32977dee54c303e4d79159",
    "sales_generated_by_offers": 1000,
    "sales_generated_total": [46826
    ],
    "start_date": "2020-05-11",
    "end_date": "2020-06-11"
  }
},
```

In some embodiments, the solution has three main pages: "My Dashboard"—the landing page of the solution, "My Scenario Planning"-page specifically for business scenario planning, and "My Offers Platform"—page for both analyzing and executing on promotions.

Figure 8:
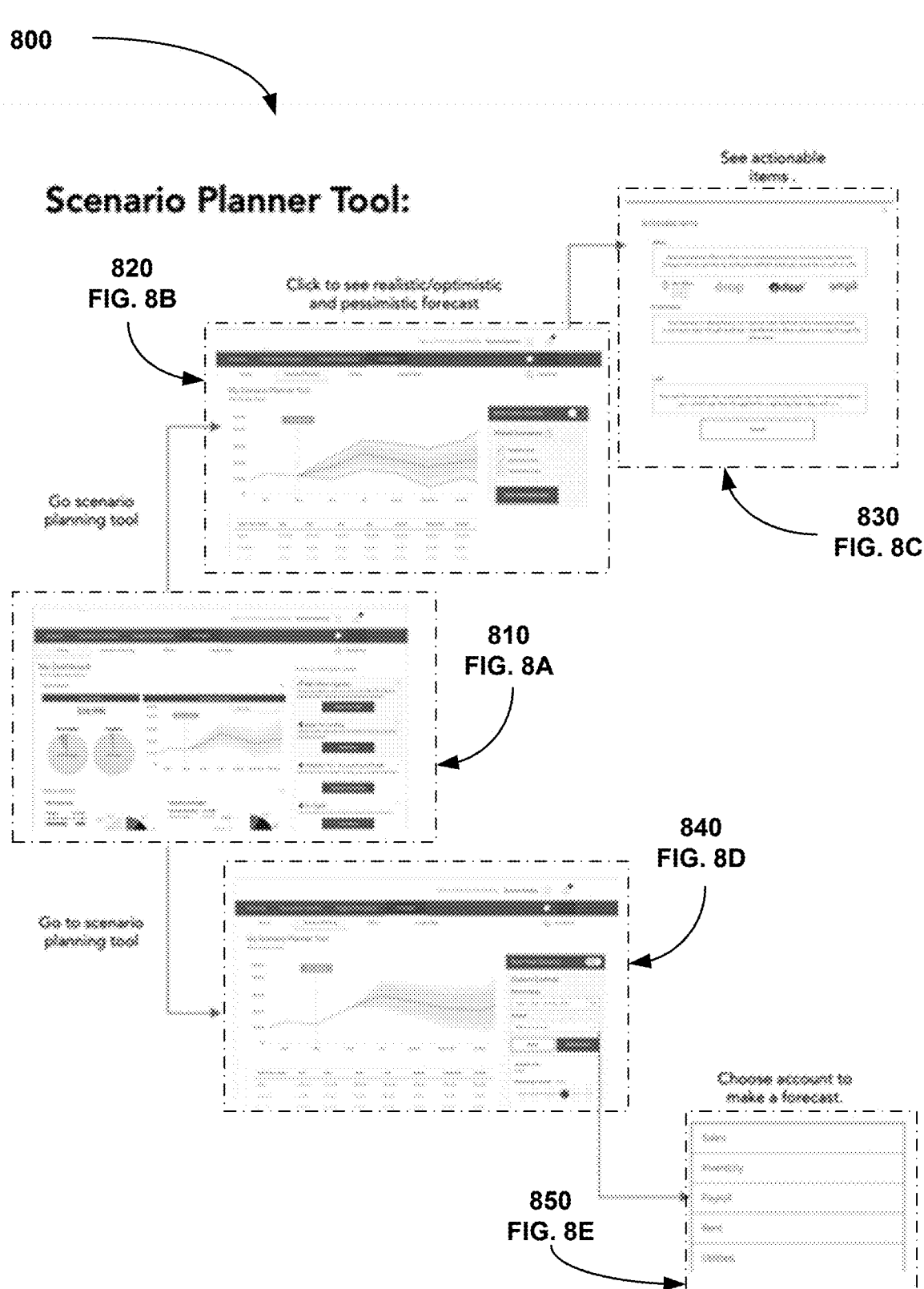
FIG. 8 illustrates, in a user flow diagram, an example of a scenario planner tool user flow, in accordance with some embodiments.
Figure 8A:
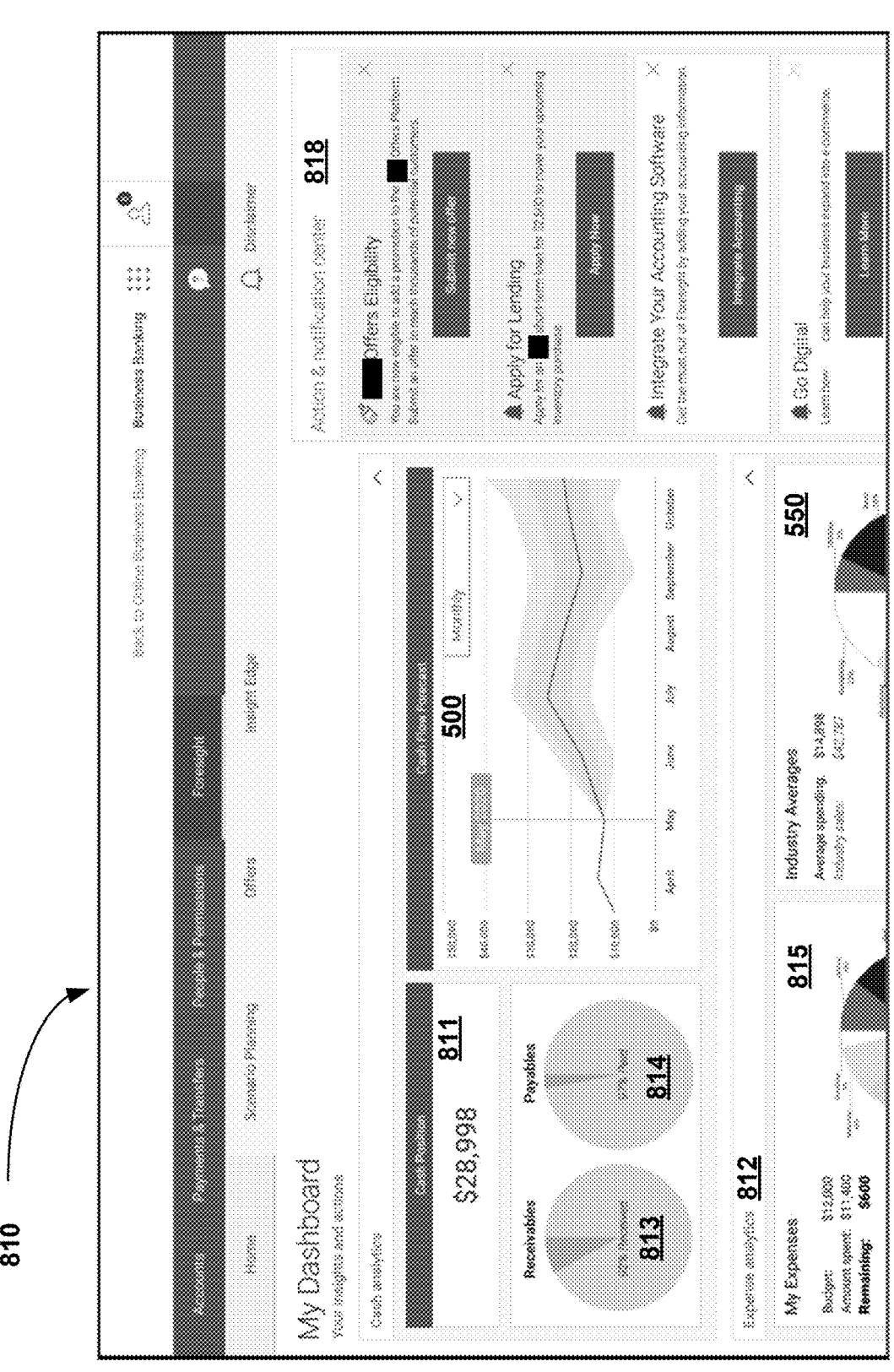
Figure 8B:
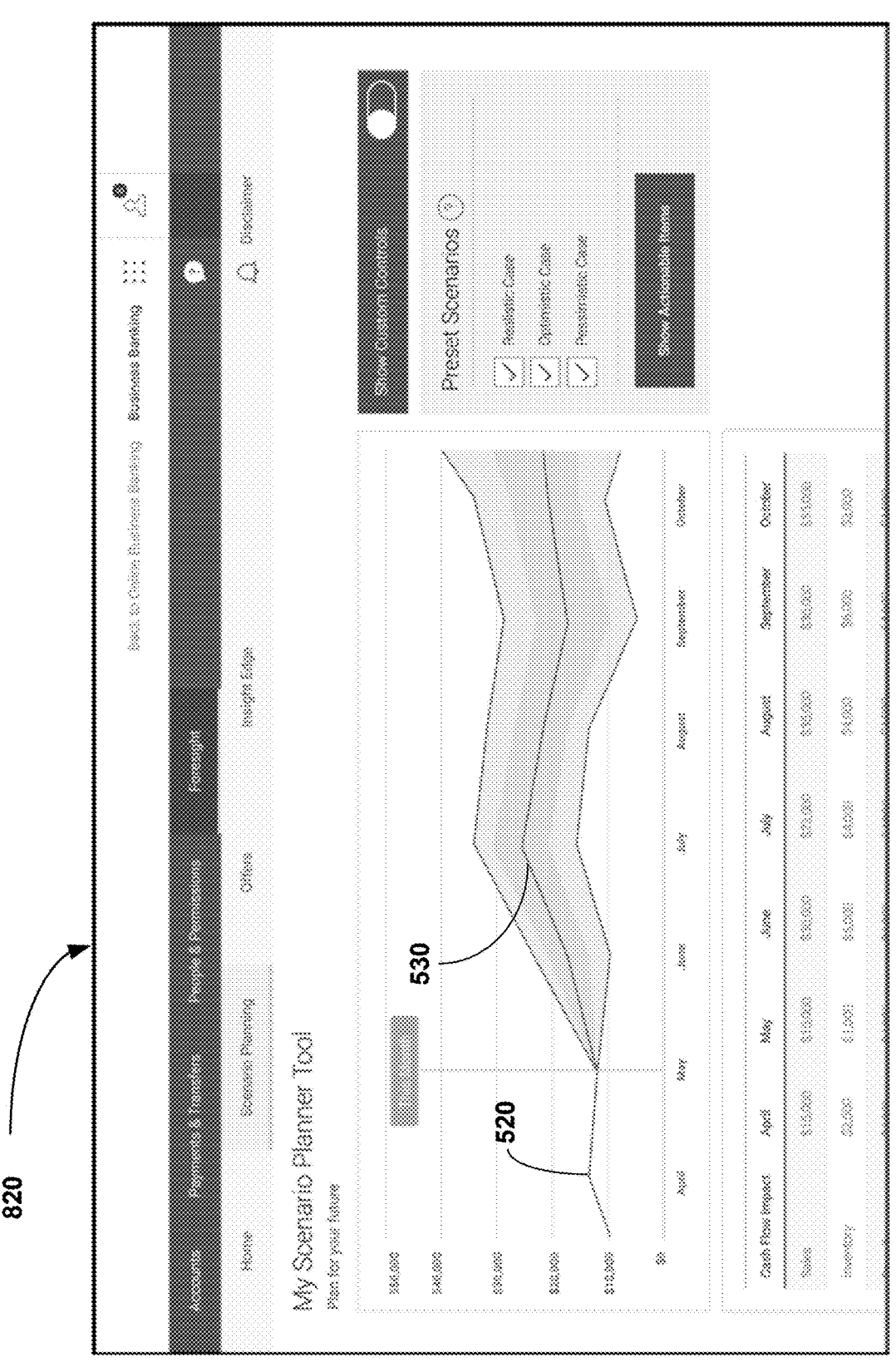
Figure 8D:
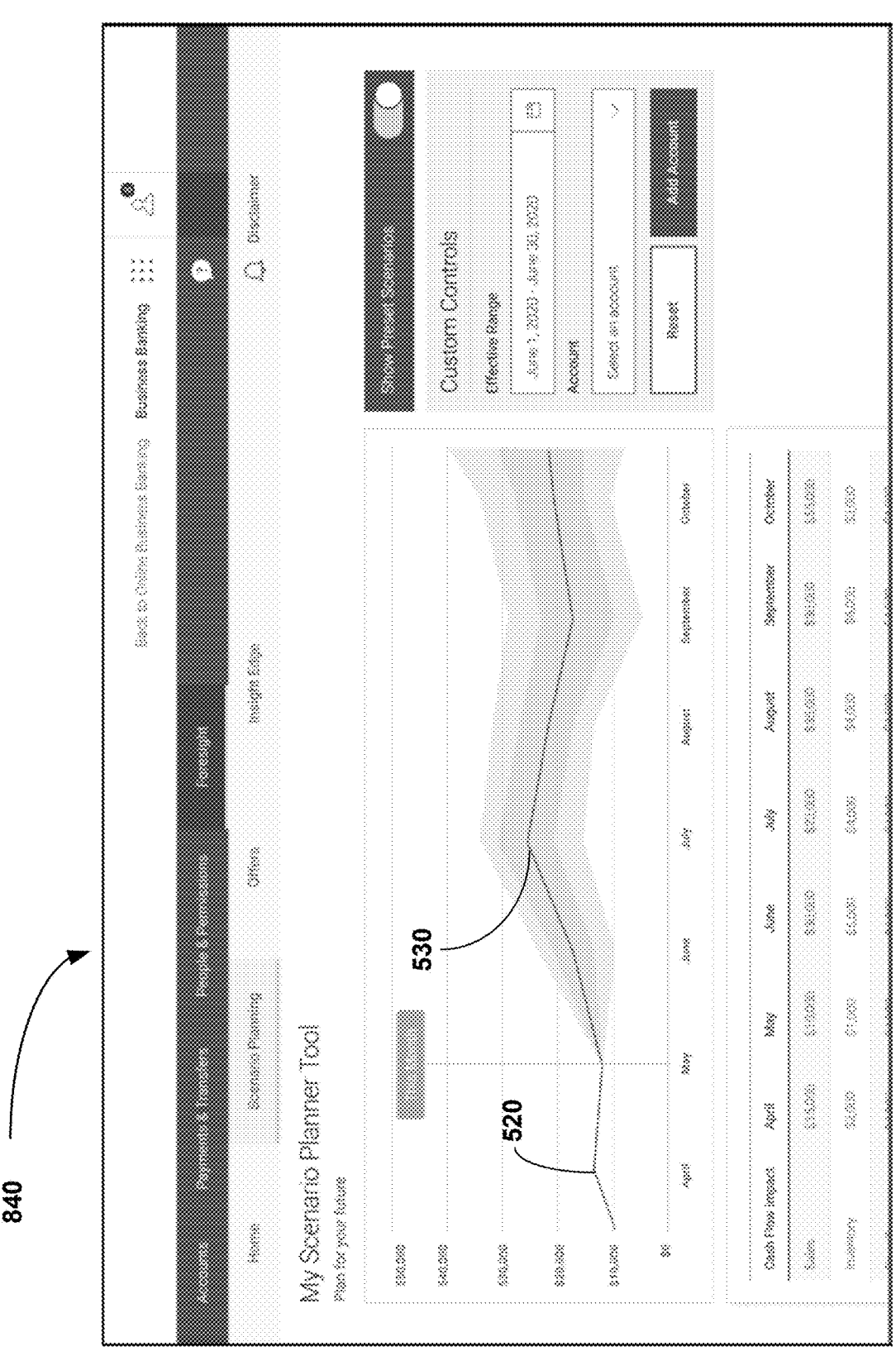
Figure 8E:
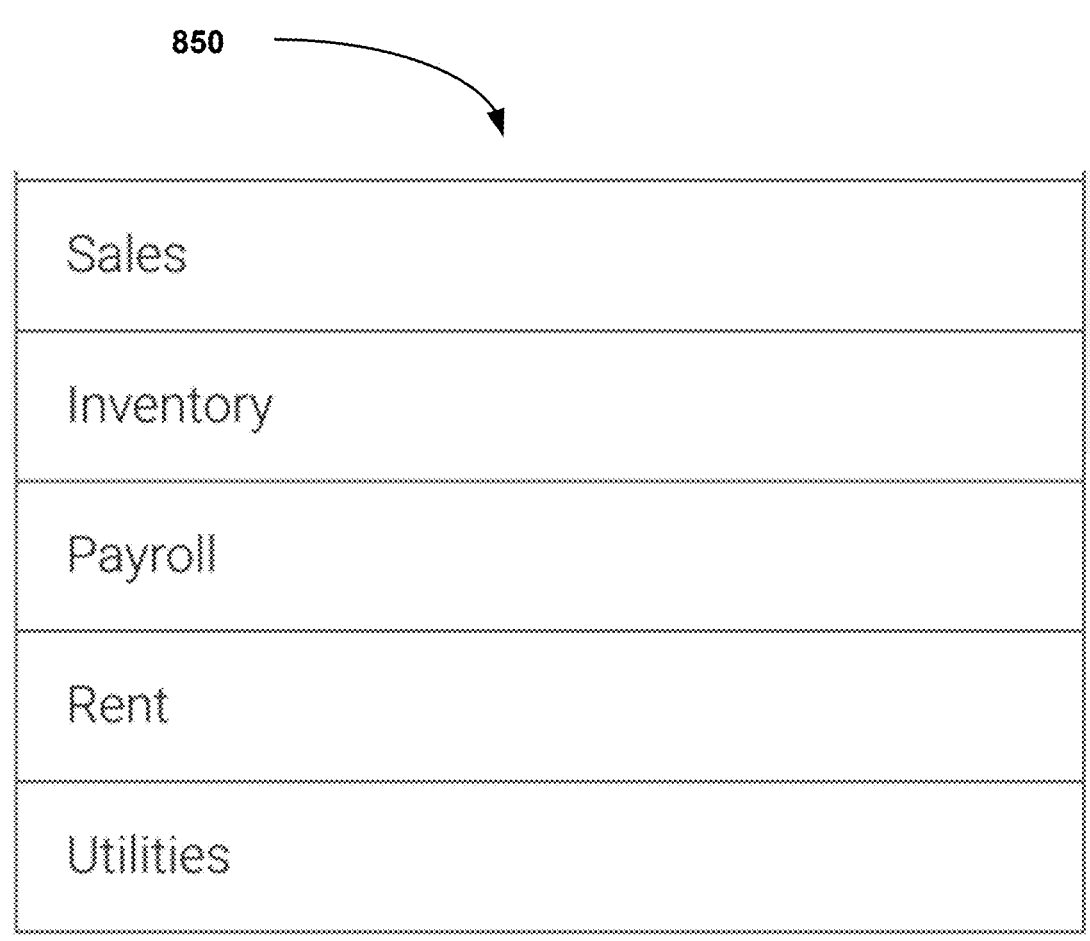

FIG. 8 illustrates, in a user flow diagram, an example of a scenario planner tool user flow 800, in accordance with some embodiments. FIGS. 8A to 8E illustrate, in screenshots, portions of the scenario planner tool user flow 810, 820, 830, 840, 850, in accordance with some embodiments. FIG. 8A represents an example of a dashboard 810 that is presented to the user. It provides several features, namely: 1) a view of the current cash position 811, 2) a view of the current positions of cash receivable 813 and cash payable 814 accounts, 3) a chart 500 depicting a forecast of potential future cash position, 4) a chart 815 depicting the projected expenses to the current actual expenses, 5) a chart 550 depicting industry average spending of the user's MCC industry, and 6) a list 818 of actionable items the user can take based on the current resource position and projections. FIG. 8B represents an example of an interactive chart and an interactive table combination 820 that is presented to the user. In some embodiments, the user is able to see the current projections for their cash position in the chart, and see an detailed account-based breakdown of the cash position in the table. The user may also see and select different projected scenarios. FIG. 8C represents an example of a view 830 that is presented to the user that suggests different actions the user could take, based on the current cash position and projections. FIG. 8D represents another example of an interactive chart and an interactive table combination 840 that is presented to the user. In some embodiments, the user is able to see the current projections for their cash position in the chart, and see an detailed account-based breakdown of the cash position in the table. The user may also modify the chart and table by modifying the cash position of accounts. FIG. 8E represents an example of a list 850 of accounts the user could select from in order to modify the chart and table in FIG. 8D.

Figure 9:
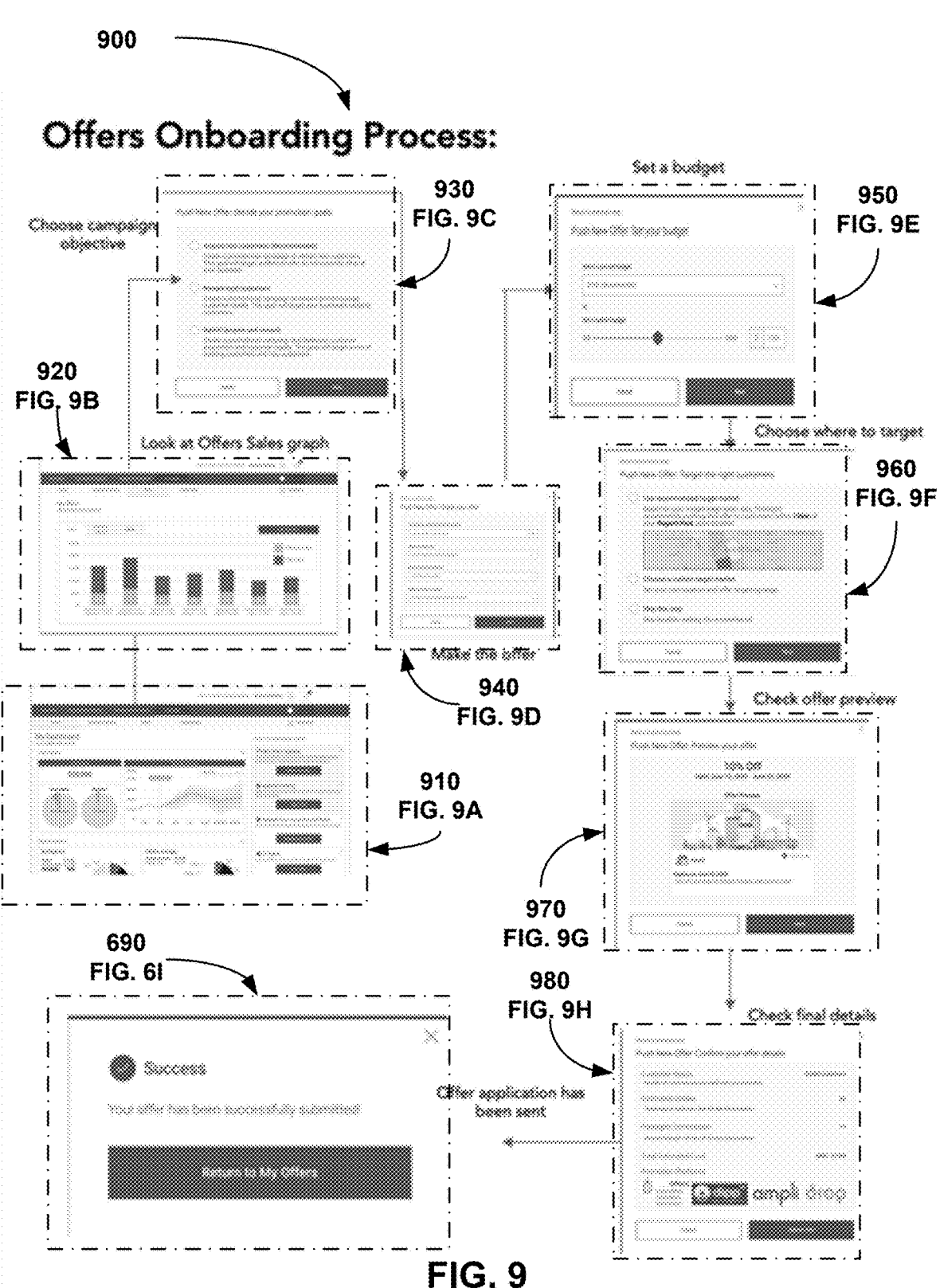
FIG. 9 illustrates, in a user flow diagram, an example of an offers onboarding process user flow, in accordance with some embodiments.
Figure 9A:
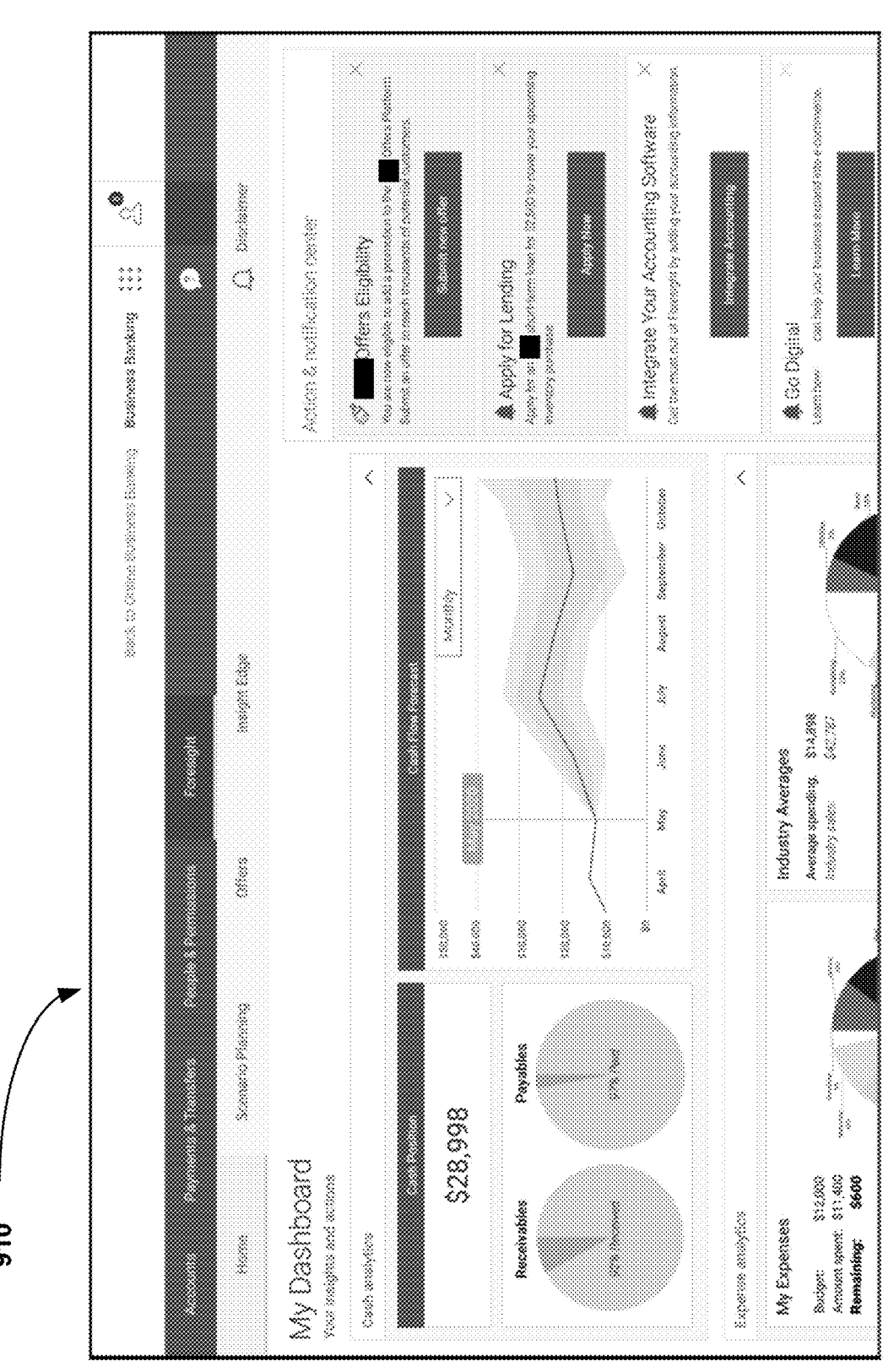
Figure 9B:
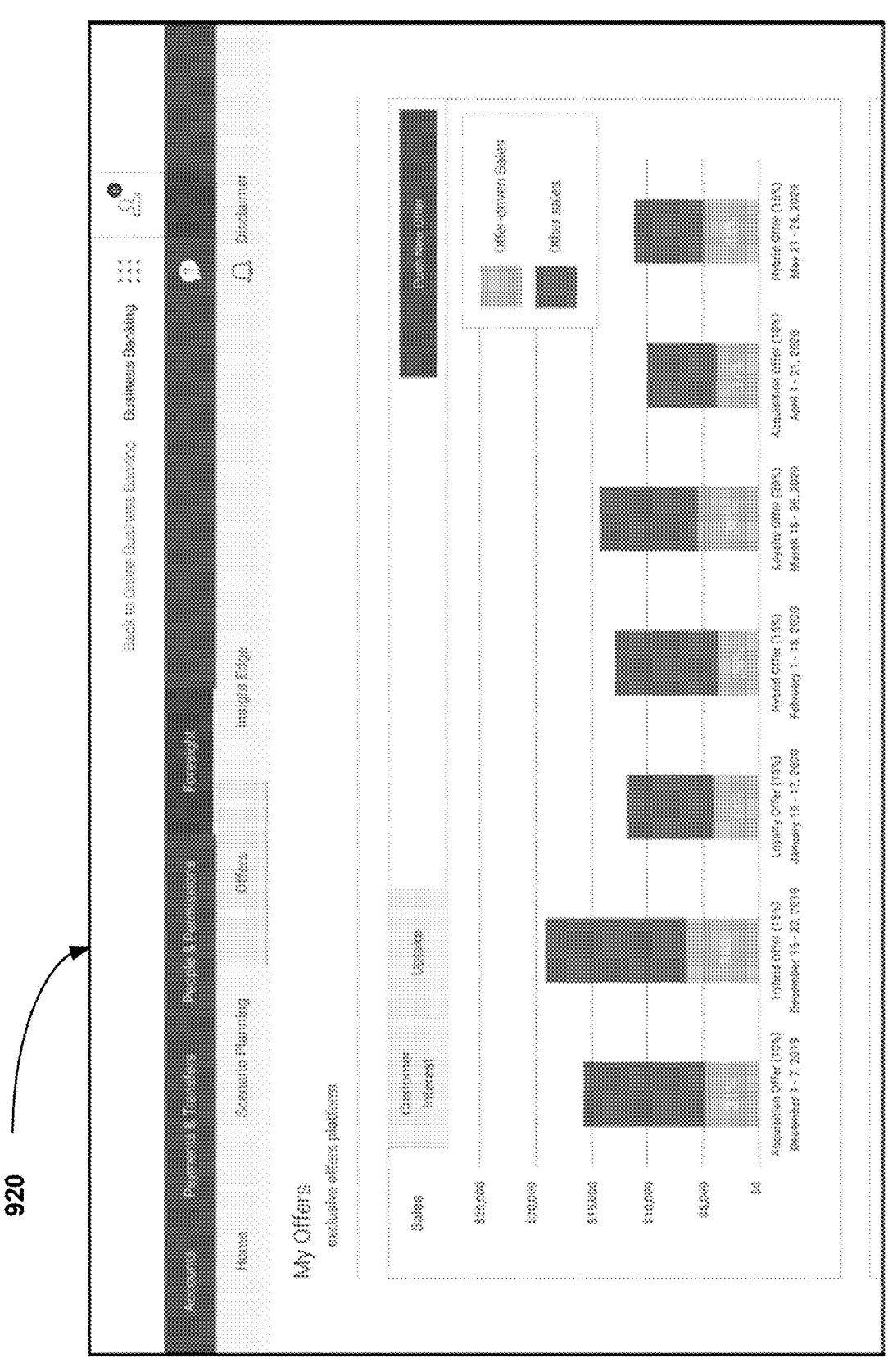
Figure 9C:
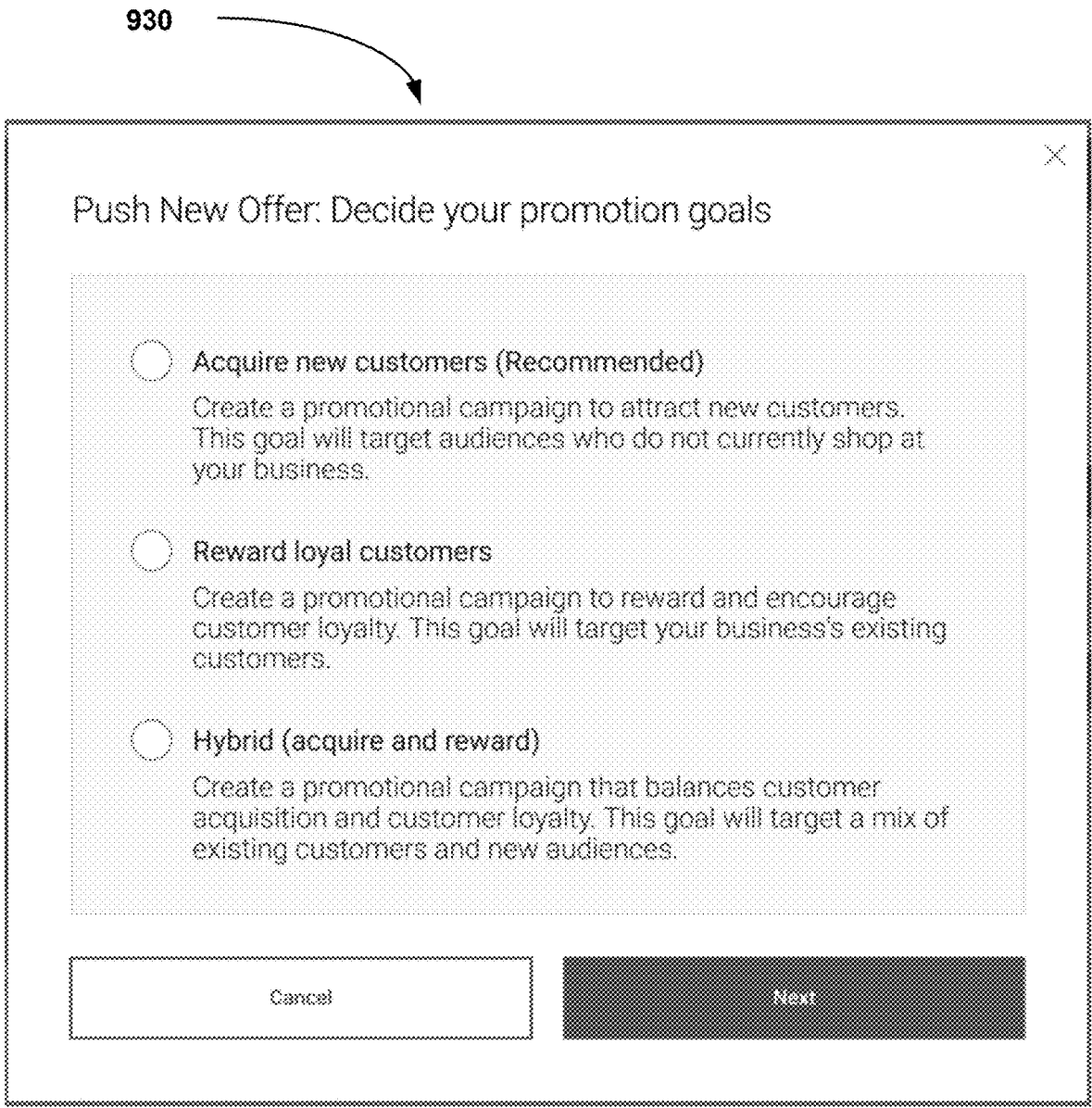
Figure 9D:
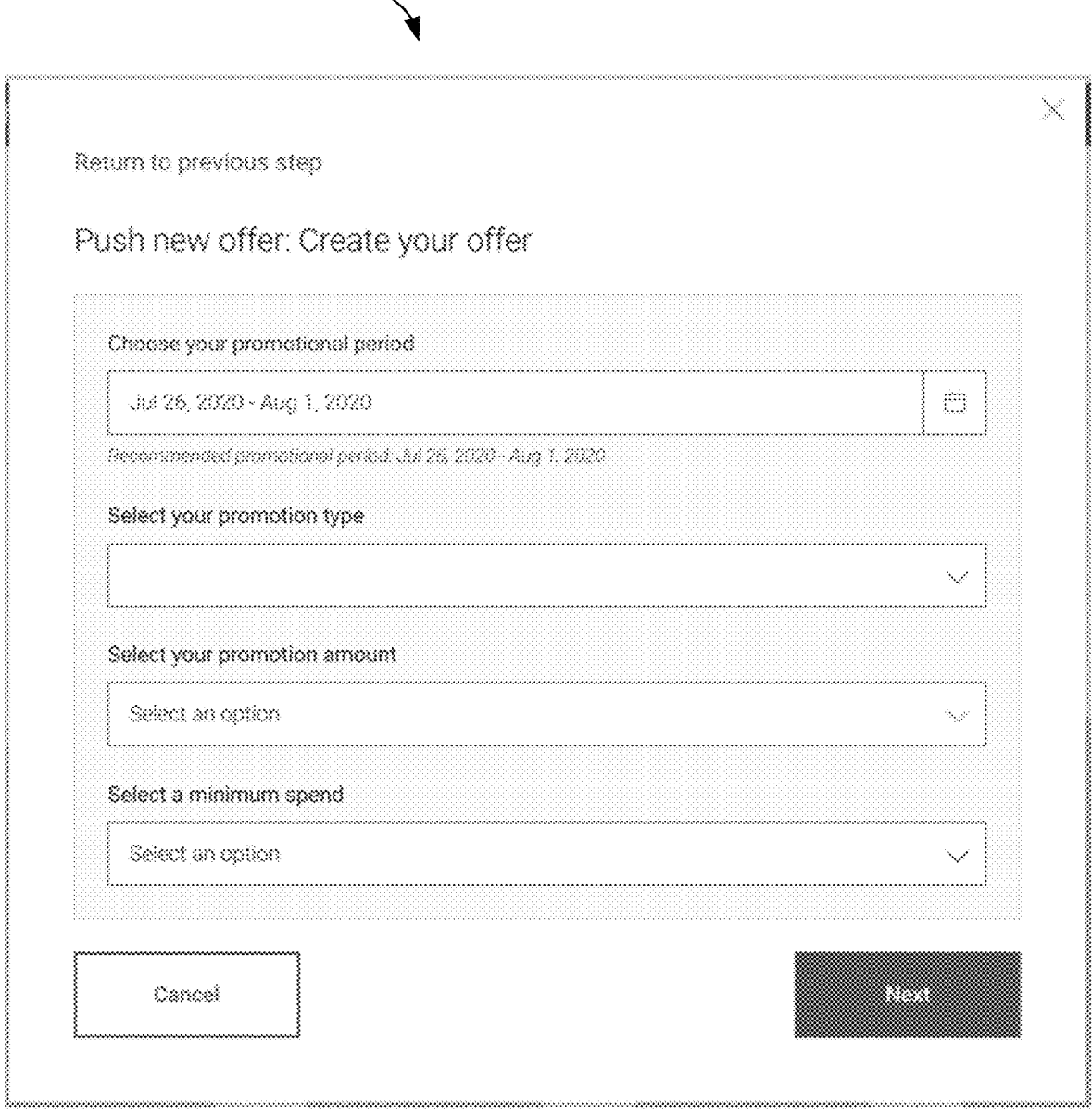
Figure 9E:
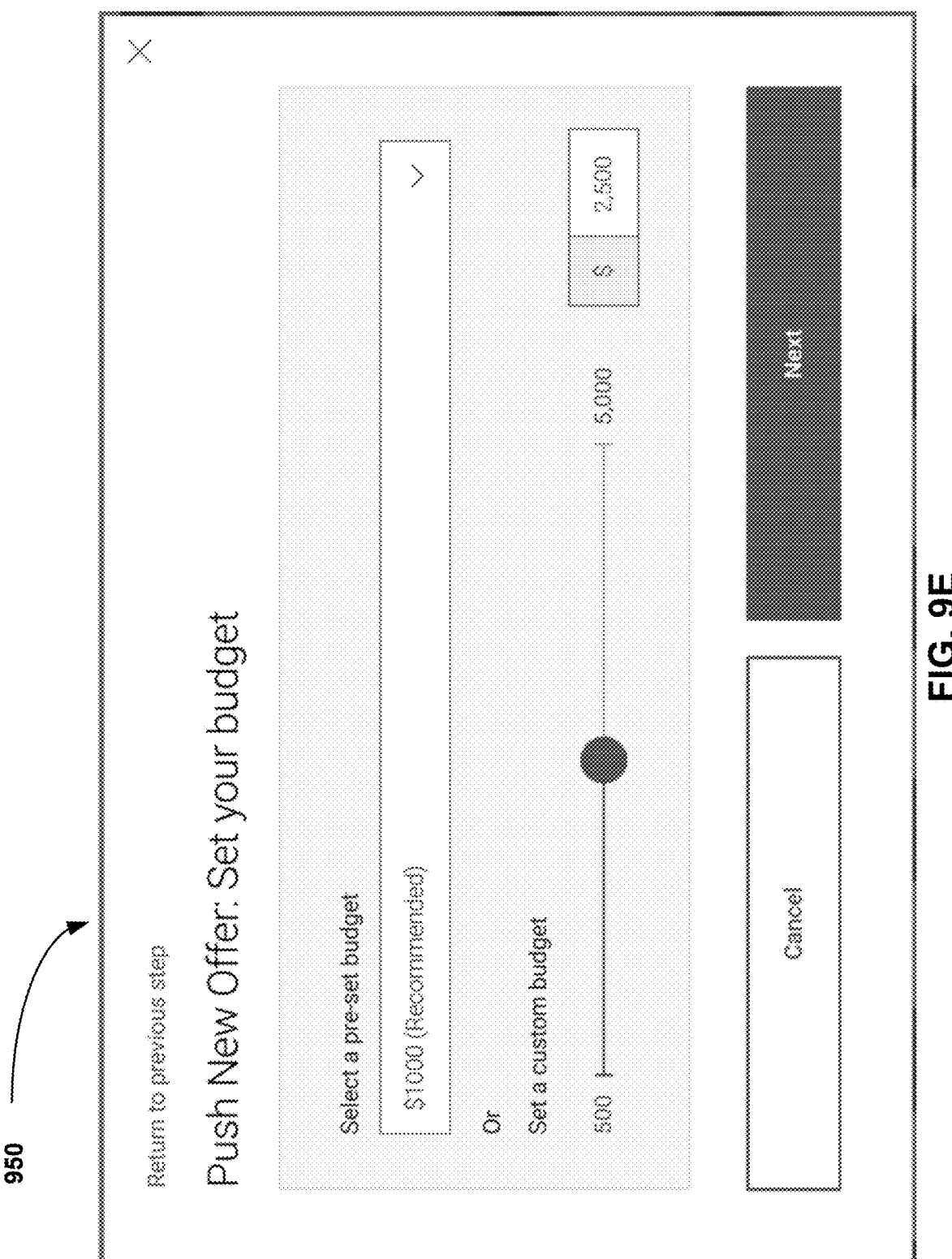
Figure 9F:
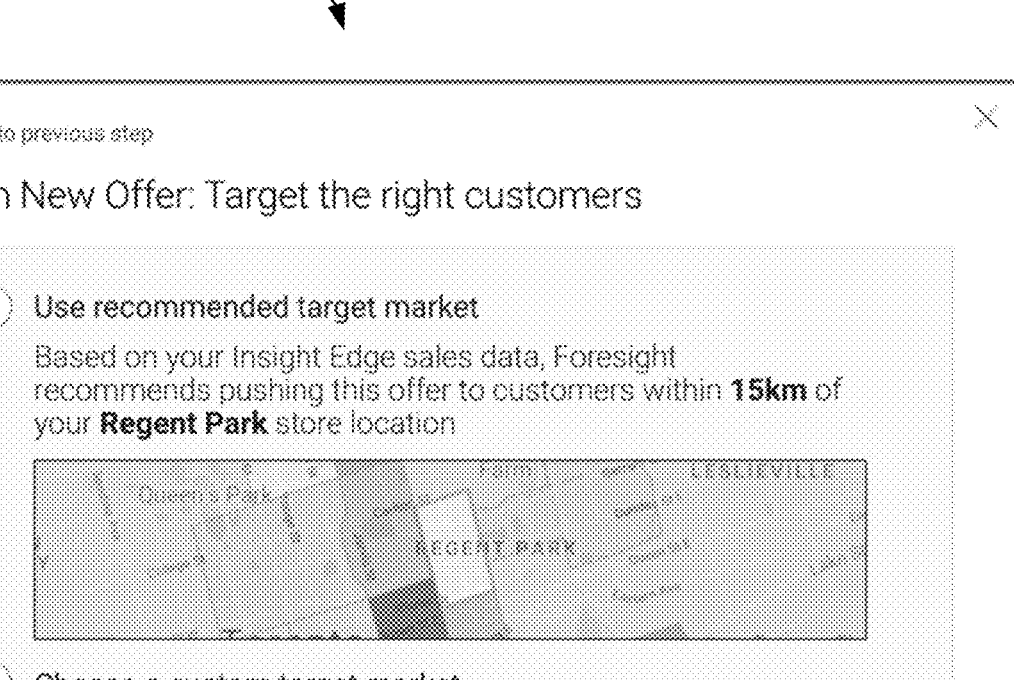
Figure 9G:
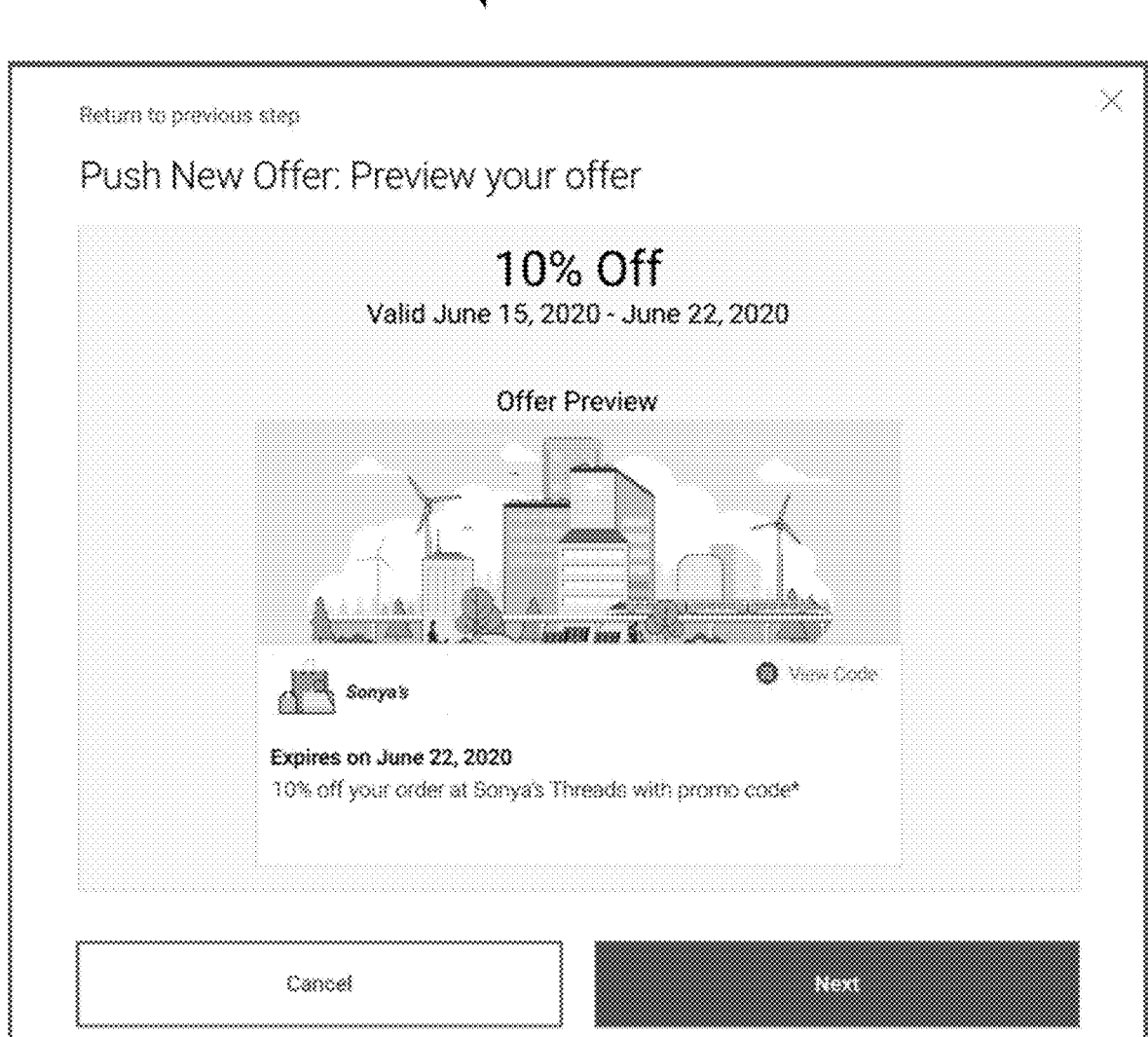
Figure 9I:
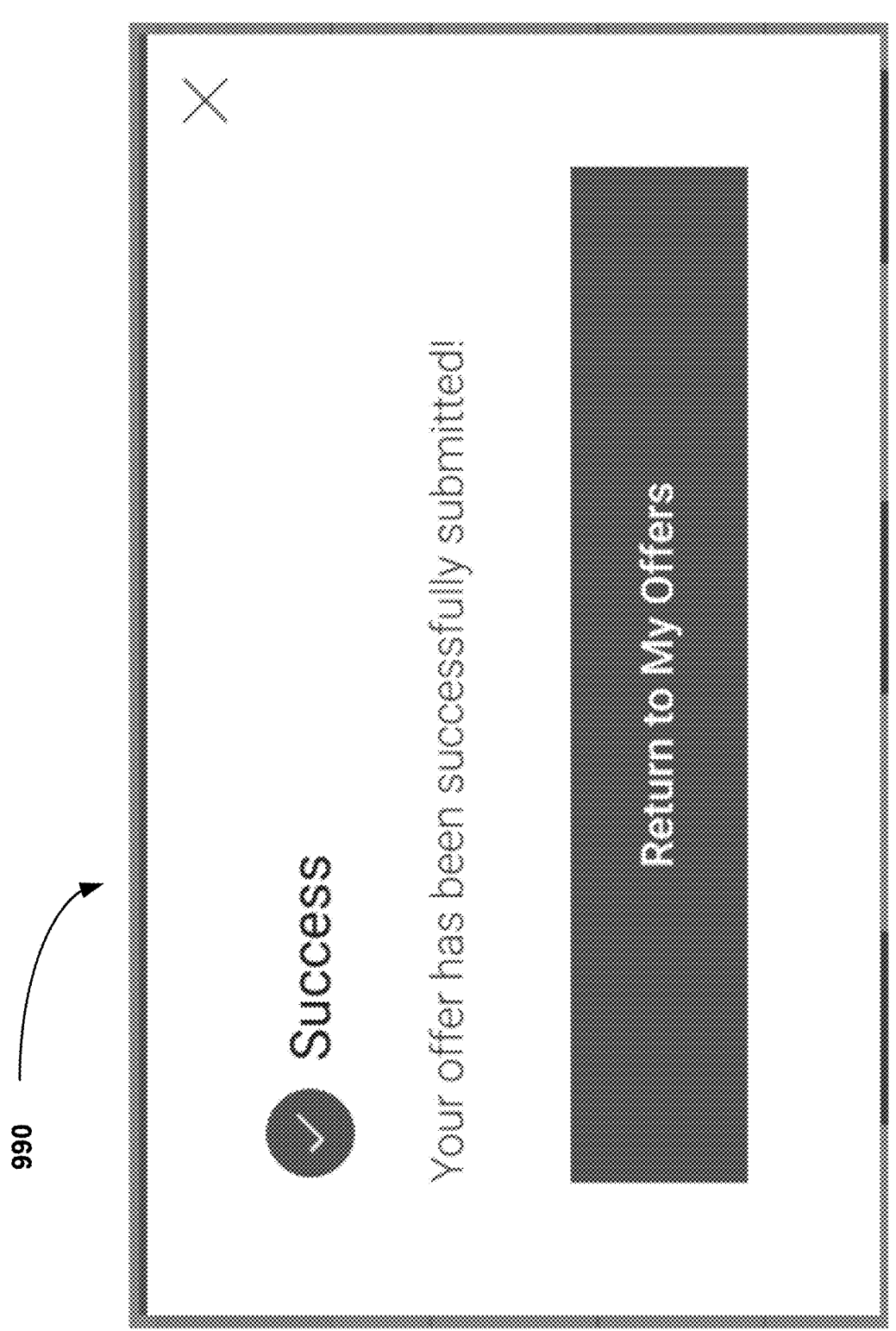

FIG. 9 illustrates, in a user flow diagram, an example of an offers onboarding process user flow 900, in accordance with some embodiments. In this context, offers are equivalent to promotions. FIGS. 9A to 9I illustrate, in screenshots, portions of the offers onboarding process user flow 910, 920, 930, 940, 950, 960, 970, 980, 990, in accordance with some embodiments. FIG. 9A represents an example of a home page 910 and central dashboard. On the dashboard the user can find Cash Analytics which shows the percentage of Accounts Receivable that the user has received and the percentage of Account Payables that the user has paid. The expense break-down shows a breakdown of the expenses the user has collected and compares it to the industry average. To the right, the user can submit new offers, apply for lending, integrate with accounting software or learn more about other digital resources. FIG. 9B shows an example of a graph 920 of the sales driven from the offers implemented and sales driven without an offer. It also shows the type of offers pushed and its duration. FIG. 9C an example of a dialog box 930 that may be the first step of creating an offer. The user would choose which promotional goal they are aiming to achieve from this offer. The three promotional goals are acquiring new customers, rewarding loyal customers or a hybrid approach. There may also be a pre-set recommendation option which is derived from the user's sales and geographical data. FIG. 9D represents an example of a dialog box 940 for an offer creation portion where the user will select the duration of the promotion, the type of promotion for example dollar or percentage discount, the promotion amount and a minimum spend the customer will need to spend to be eligible for the promotion. FIG. 9E shows an example of a dialog box 950 that may assist the user select a budget for their new offer either through a pre-set (recommended) budget or a custom budget selected by the user. FIG. 9F shows an example of a dialog box 960 that allows users to choose a geographical market they would like to target for the offer. Users can either use the recommended target market which is a recommendation formed using the user's sales data. For example, if the user wants to acquire new customers and their lowest number of sales is coming from Regent Park it can possibly send this area as a recommendation to increase sales here and acquire new customers. The user can also choose a custom market or skip the step. FIG. 9G shows an example of a dialog box 970 with the offer preview and how it will look to the consumer. FIG. 9H shows an example of a dialog box 980 with the details of the offer. The breakdown shows the number of customers the promotion will reach and an estimate of customers that will take the offer. It also shows the cost for commission and total estimated cost for the offer. The offer can be sent on multiple platforms such as Offers, Dipp, Ampli and Drop. FIG. 9I shows a dialog box 990 that may be the last step of the Offers Onboarding process as the offer has now been submitted and will be reviewed.

Offers may take the form of anything from %-off promotions, to buy-one-get-one free promotions.

A dashboard to see historical sales may be provided in the form of a graph—showing historical sales, including points on the graph to indicate when offers were executed through the platform. This allows business owners to see impact historical promotions have made on their sales.

An offer wizard allows business owners to quickly and easily put together a new promotion using a wizard. This gives business owners the ability to push those wizard-built promotions to an enterprise offers function (e.g., a backend database that an enterprise offers team would be able to pull from, approve, then push to the platform; another example includes a simple web-app for business owners to track the status of their promotion, and for the enterprise offers team to review and push promotions). Using insight data, recommendations can be made to users to make promotions that are optimized to their business and customer base.

Forecasting

Most conventional forecasting solutions are local, meaning they only use data from the target time series to forecast itself. With a global model like Deep Autoregressive Networks, cash flow of all users can be forecast using the representation that the model learns (or trained on) from all users. To demonstrate, to forecast six transaction categories for 500,000 users, three (3) million models are not needed; instead only six (6) models are needed that learn to forecast each category for all users. This is achievable with DeepAR because since each model contains one (1) hidden state for each time series identifier (ID) (e.g., one (1) hidden state for one (1) user), the model will forecast all 500,000 users since there are a set of neurons/weights for hidden state, and thus each user. Furthermore, because these hidden states are linked with one another, data supplied to the network for one user (e.g., user 2) can help forecast data for another user (e.g., user 5). Although the model would be larger, it learns more efficiently due to the shared weights and captures all users, not just one per model. This feature helps reduce number of models required significantly, and this allows the model to forecast cash flow of users, even with limited historical data, since the model can still learn from the cash flow of other users.

The training of the DeepAR model is autoregressive, meaning it iteratively forecasts data in the time series at sliced windows (e.g., each window may be of size 5) and updates its weight based on whether the forecasted data matches what the truth future data is. For instance, if given sales=[1, 2, 3, 4, 5], and the model forecasts [6, 7, 8, 9, 11], while the truth is [6, 7, 8, 9, 10], the model would update its neurons/weights to account for this discrepancy in prediction, which helps it improve its following forecasts.

Decision-Making and Insights

In some embodiments, rule-based algorithms are used to recommend actions to clients (such as rate of change and moving averages). In some embodiments, the magnitude and combination of time series, probabilistic forecast, and action data that are collected from users as they use the platform can be used to provide optimal recommendations using various techniques such as stochastic optimization and reinforcement learning.

Note throughout the description, "offers" can be treated the same as "promotions".

Stochastic Optimization

Stochastic optimization is an optimization technique that uses random variables for its objective and/or constraints. With this, optimal variables may be obtained, such as actions or costs based on random variables such as probabilistic forecasts or probabilistic particle locations. For example, "How many keys should I manufacture today so that I generate most sales tomorrow while keeping costs below $500?"

Offers lengths, types, costs, and outcomes may be collected and stored in a database (e.g. MongoDB). This data may then be used as covariates to generate forecasts (i.e. indicate which parts of the time series offers exist). Since probabilistic forecasts generated by DeepAR are random variables, these can be used as variables in a stochastic optimization problem formulation to generate random constraints and/or random objective functions.

In some embodiments, an objective can be set to (in words): maximize sales forecasts (outcome variable) due to offers (action variable) subject to constraints of: i) Offer cost<client's budget; ii) Net profit within time period>client's target profit or average profit of client. This model can be extended as needed. With action-based forecasts, future actions can be determined that maximizes potential sales generated. Stochastic optimization is general, meaning it can also be applied for deterministic forecasts which would be much simpler but less representative of real-world dynamics.

The following illustrates an example of the stochastic optimization solution:

$$\max \sum_{t+1}^{T} \hat{S}(\vec{O}_{i,t+1:T}) \qquad \text{Equation (1)}$$

$$\text{s.t.} \sum_{t+1}^{T} C(\vec{O}_{i,t+1:T}) < b$$

$$\sum_{t+1}^{T} p \geq \hat{p}_{t+1:T}$$

where $\vec{O}_{i,t+1:T}$ is a vector of offers of type $i$ within forecasting horizon $t+1{:}T$, $\hat{S} = DeepAR\left(S_{0:t}, \vec{O}_{i,t+1:T}\right)$ is forecasted sales, $C(\vec{O}_{i,t+1:T})$ is cost of offer, $b$ is client's offer budget, and $p = \text{profit and } \hat{p} = \text{target profit}$ Reinforcement Learning Reinforcement learning (RL) trains a computer agent to make actions that maximizes rewards or minimizes punishment by allowing them to learn via trial and error. Assuming a discretized setting (meaning variables are countable), the agent can select an action from a pre-defined action space and based on its previous and resultant states, the agent is given a reward/punishment. By going through this process repeatedly, the agent eventually learns the dynamics of the system and understands what actions lead to highest rewards or lowest punishments.

Similarly, offer lengths, types, cost and outcomes may be collected. A "model" is then generated that explains the dynamics of what offer types/lengths/costs lead to which outcomes. In RL terms, this is defined as a "Transition Probability Matrix".

Then, say the RL agent is put at the beginning of 2015 and it has an initial cash position of $5000. It may choose an action every day, where each action can be making a promotion of various types and costs. Based on the transition probability matrix, or simply put, the model, its next state after each day and action is determined. The agent may "play the game" from 2015 to 2020. This concludes one (1) episode. At each 'episode', its cash position at the end is determined, and the "set of actions" that led to higher cash positions shall be rewarded/weighted more. In some embodiments, as many episodes as desired may be generated, and by a certain number of episodes, the agent is able to consistently make large profits.

The following illustrates an example of the reinforcement learning solution:

Equation (2)

With Bellman's equation $V^\pi(s) = \sum_a \pi(a|s) \sum_s p(s', r_s|s, a)[r_s + \gamma V^\pi(s')]$ where $s$ is agent's current cash flow state, $s'$ is next cash flow state, $a$ is action taken by agent(no action, making a promotion, applying for loan, etc), $r_s$ is reward assigned for being in a particular state, $\gamma$ is the discount factor, $p(s', r_s|s, a)$ is state transistion probability which can be determined by *DeepAR* probabilistic forecasts, $V(s)$ is value of being in state $s$, updated every time an action $a$ based on state $s$ $\pi(a \mid s)$ is a policy function that determines an action $a$ based on state $s$ Determine $\pi^* = \text{argmax}_\pi V^\pi(S) \forall s \in S$ via dynamic programming and self play Experts/commercial account managers (CAMs) may enter insights they see based on the data provided to them on the platform, which can be stored and provided to clients given similar situations in the future. Using location intelligence and demographic data from an integration with an insight platform, targeted and data-driven offer constructs for clients may be recommended. Accordingly, offer effectiveness may be tracked and recorded by gathering key performance indicators (KPIs) such as click and adoption rate to adjust and cater client offers to specific users.

Lending

In some embodiments, algorithms that evaluate cash flow against sales forecast may be used to detect possible regions of negative cash flow where loans can be taken while sales forecast shows that the client can pay back the loan.

In some embodiments, global probabilistic forecasting may be applied with Deep Autoregressive Networks to the use case of Global Cash Flow Forecasting.

In some embodiments, custom rule-based algorithms may be used to recommend actions for clients, including expense reductions, promotions, and loan applications.

In some embodiments, once enough data on actions and outcomes are collected, stochastic optimization or reinforcement learning can be used to recommend optimal actions.

In some embodiments, recommend data-driven promotional constructs based on location intelligence and customer demographic, powered by insight data.

In some embodiments, day-to-day cash flow analysis opens up opportunities for business clients to apply for day-to-day loans. This allows them to get small loans that can help sustain or further increase their revenue while simultaneously demonstrating they can pay the loan back based on cash flow and sales forecasts.

An example for Scenario Planning is as follows: Given sales data as shown: [1, 2, 3, 4, 5]. If the user chooses to forecast five (5) days into the future, an example forecast output from the DeepAR model could be [6, 7, 8, 9, 10], rendering a combined time series as [1, 2, 3, 4, 5, 6, 7, 8, 9, 10], which may be named "original time series". Then, if the user anticipates that their sales on the another forecasted date (e.g., the third forecasted data which would be 8 in this example) would surge to another value (e.g., 10), then the "new time series" would be [1, 2, 3, 4, 5, 6, 7, 10, 9, 10]. Thus, if the user would like to forecast even further into the future (e.g., another five days) with this scenario in mind, they would input this new time series into the DeepAR model, and get a new forecast. With the "original time series", the forecast might be (for example) [11, 12, 13, 14, 15], but accounting for this scenario with the "new time series", the forecast could be [15, 12, 15, 16, 17], perhaps inflated due to the surging sales scenario.

An example for promotion generation is as follows: Given past sales data as shown: for example, a=[10, 9, 8, 10, 9], and that the user receives a forecast of, for example, b=[8, 7, 10, 9, 8]. Several algorithms can be used to recommend user actions in the future, keeping in mind that users can only make actions within and after the forecast interval, b, not within the past interval, a. For instance, a rule-based algorithm can be used to sense that sales on day 1 and 2 on the forecasted period is declining (e.g., [8,7]). This decline could lead to recommend user to do a promotion during day 1 and 2 on the forecasted period. Another method, stochastic optimization, as discussed earlier, can also be used, to give an action recommendation that maximizes the user's forecasted sales based on their promotion budget and costs. For instance, if the stochastic optimization algorithm finds that applying promotion on day 2 (i.e., sales: 7) in the forecasted window could lead to sales of (for example) c=[11, 12, 14, 15, 16] following the already forecasted interval, b, and it is the most optimal since user spends the least for promotion yet generates the most sales. Finally, another approach is to use reinforcement learning as discussed earlier, where the reinforcement learning agent that has learned to apply promotions in the past (for example in equation (2)), could take the forecasted data, b, into account, and recommend actions for forecasted interval, b, since it has learned the dynamics of the model of how applying promotion on day 2 in forecast interval b with sales (e.g., 8) can improve the sales on day 3.

Figure 10:
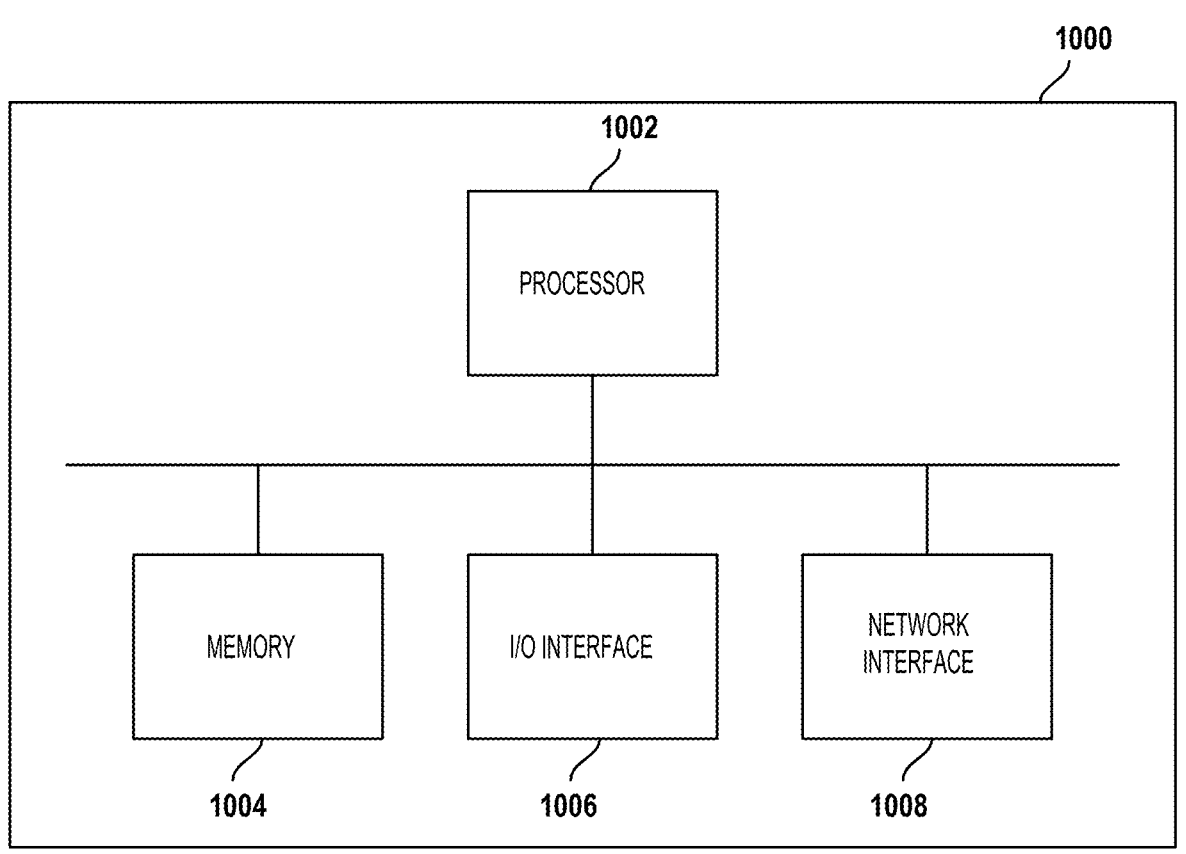
FIG. 10 is a schematic diagram of a computing device such as a server.

FIG. 10 is a schematic diagram of a computing device 1000 such as a server. As depicted, the computing device includes at least one processor 1002, memory 1004, at least one I/O interface 1006, and at least one network interface 1008.

Processor 1002 may be an Intel or AMD x86 or x64, PowerPC, ARM processor, or the like. Memory 1004 may include a suitable combination of computer memory that is located either internally or externally such as, for example, random-access memory (RAM), read-only memory (ROM), compact disc read-only memory (CDROM).

Each I/O interface 1006 enables computing device 1000 to interconnect with one or more input devices, such as a keyboard, mouse, camera, touch screen and a microphone, or with one or more output devices such as a display screen and a speaker.

Each network interface 1008 enables computing device 1000 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WIMAX), SS7 signaling network, fixed line, local area network, wide area network, and others.

The discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A system for intelligent resource management, the system comprising:

at least one processor; and a memory comprising instructions which, when executed by the processor, configure the processor to:

receive resource data and usage data, wherein the usage data comprises location data corresponding to the resource data;

preprocess and convert the resource data and the usage data into operational data;

train a foresight model on labelled data, wherein the foresight model comprises an autoregressive model that iteratively generates forecasts at time intervals in a time series, the autoregressive model comprising a set of neurons defining a plurality of hidden states, wherein the plurality of hidden states encapsulates historical data of a plurality of users, wherein the autoregressive model updates the set of neurons based on whether each forecast matches a truth future data;

update the foresight model using the operational data;

receive a forecast generated by the foresight model for the time series, the forecast associated with a future resource state or event associated with the operational data for a location identified in the location data;

send a notification for a recommended action based on the forecast, wherein the recommended action optimizes the future resource state or event associated with the operational data to reach a target outcome state or event;

cause to display, at an electronic device, a graphical interface comprising a first graphical user interface (GUI) element displaying a location view of the generated forecast for the location identified in the location data and a second GUI element comprising an input control, wherein data from the input control of the second GUI element is used to update the displayed forecast in the first GUI element;

receive, from the electronic device, user input representing a modification of the operational data, the modification of the operational data comprising a modification to the time series, the user input received from the input control of the second GUI element;

receive an updated forecast generated by the foresight model, the forecast associated with a future resource state or event associated with the modified operational data for the same location identified in the location data, wherein the updated forecast is based on the user input received from the second GUI element; and in response to the user input and based on the modification of the operational data, cause to display, at the electronic device, the updated forecast in the first GUI element, wherein the first GUI element displays the updated forecast in a location view corresponding to the same location identified in the location data.

2. The system as claimed in claim 1, wherein the at least one processor is configured to initially train the model.

3. The system as claimed in claim 1, wherein the recommended action is based on the forecast being below a threshold.

4. The system as claimed in claim 1, wherein the recommended action is based on a match between the recommended action and the forecast.

5. The system as claimed in claim 1, wherein the at least one processor is configured to send the notification based on a current time and a location of a market associated with the resource data.

6. The system as claimed in claim 1, wherein:
the resource data comprises transactional data;
the usage data comprises at least one of sales data, customer data, location data, competitor data, and inventory data; and
the recommended action comprises an offer or sales promotion.

7. The system as claimed in claim 1, wherein:
the usage data comprises at least one of transactional data, merchant information, or client card information; and
the resource data comprises at least one of a commercial account number, or a client identifier.

8. The system as claimed in claim 7, wherein to preprocess the resource data and the usage data into operational data, the at least one process of configured to:
merge the resource data and the usage data; and
enhance the merged data with external context data.

9. The system as claimed in claim 8, wherein the at least one processor is configured to at least one of:
maintain the commercial account number intact after the merge of the resource data and the usage data;
maintain a purchase amount of the transactional data intact after the merge of the resource data and the usage data; or
link the transactional data to the commercial account number.

10. The system as claimed in claim 1, wherein the at least one processor is configured to train a recommendation model to provide the recommendation action based on the operational data using at least one of stochastic optimization or reinforcement learning.

11. A computer-implemented method for intelligent resource management, the method comprising:
receiving resource data and usage data, wherein the usage data comprises location data corresponding to the resource data;
preprocessing and converting the resource data and the usage data into operational data;
training a foresight model on labelled data, wherein the foresight model comprises an autoregressive model that iteratively generates forecasts at time intervals in a time series, the autoregressive model comprising a set of neurons defining a plurality of hidden states, wherein the plurality of hidden states encapsulates historical data of a plurality of users, wherein the autoregressive model updates the set of neurons based on whether each forecast matches a truth future data;

updating the foresight model using the operational data;

receiving a forecast generated by the foresight model for the time series, the forecast associated with a future resource state or event associated with the operational data for a location identified in the location data;

sending a notification for a recommended action based on the forecast, wherein the recommended action optimizes the future resource state or event associated with the operational data to reach a target outcome state or event;

causing to display, at an electronic device, a graphical interface comprising a first graphical user interface (GUI) element displaying a location view of the generated forecast for the location identified in the location data and a second GUI element comprising an input control, wherein data from the input control of the second GUI element is used to update the displayed forecast in the first GUI element;

receiving, from the electronic device, user input representing a modification of the operational data, the modification of the operational data comprising a modification to the time series, the user input received from the input control of the second GUI element;

receiving an updated forecast generated by the foresight model, the forecast associated with a future resource state or event associated with the modified operational data for the same location identified in the location data, wherein the updated forecast is based on the user input received from the second GUI element; and in response to the user input and based on the modification of the operational data, causing to display, at the electronic device, the updated forecast in the first GUI element, wherein the first GUI element displays the updated forecast in a location view corresponding to the same location identified in the location data.

12. The computer-implemented method as claimed in claim 11, further comprising initially training the model.

13. The computer-implemented method as claimed in claim 11, wherein the recommended action is based on the forecast being below a threshold.

14. The computer-implemented method as claimed in claim 11, wherein the recommended action is based on a match between the recommended action and the forecast.

15. The computer-implemented method as claimed in claim 11, further comprising sending the notification based on a current time and a location of a market associated with the resource data.

16. The computer-implemented method as claimed in claim 11, wherein:
the resource data comprises transactional data;
the usage data comprises at least one of sales data, customer data, location data, competitor data, and inventory data; and
the recommended action comprises an offer or sales promotion.

17. The computer-implemented method as claimed in claim 11, wherein:
the usage data comprises at least one of transactional data, merchant information, or client card information; and
the resource data comprises at least one of a commercial account number, or a client identifier.

18. The computer-implemented method as claimed in claim 17, wherein preprocessing the resource data and the usage data into operational data comprises:

merging the resource data and the usage data; and enhancing the merged data with external context data.

19. The computer-implemented method as claimed in claim 18, comprising at least one of:

maintaining the commercial account number intact after the merge of the resource data and the usage data;

maintaining a purchase amount of the transactional data intact after the merge of the resource data and the usage data; or linking the transactional data to the commercial account number.

20. The computer-implemented method as claimed in claim 11, comprising training a recommendation model to provide the recommendation action based on the operational data using at least one of stochastic optimization or reinforcement learning.

* * * * *